United States Patent [19]
Ogawa

[11] Patent Number: 6,113,724
[45] Date of Patent: Sep. 5, 2000

[54] LAMINATION MOLDING METHOD AND AN APPARATUS THEREOF

[75] Inventor: Masahiko Ogawa, Ohbu, Japan

[73] Assignee: Kabushiki Kaisha Meiki Seisakusho, Ohbu, Japan

[21] Appl. No.: 09/151,284

[22] Filed: Sep. 11, 1998

[30] Foreign Application Priority Data

| Sep. 17, 1997 | [JP] | Japan | 9-251878 |
| Dec. 19, 1997 | [JP] | Japan | 9-350649 |
| Jun. 25, 1998 | [JP] | Japan | 10-178422 |

[51] Int. Cl.[7] ................................................. B32B 31/00
[52] U.S. Cl. .................. 156/212; 156/285; 156/382; 156/583.3
[58] Field of Search ........................ 156/212, 583.3, 156/298, 382, 245, 285, 286

[56] References Cited

U.S. PATENT DOCUMENTS 5,558,015  9/1996  Miyashita et al. .

FOREIGN PATENT DOCUMENTS 4-52200  2/1992  Japan .

Primary Examiner—Francis J. Lorin
Attorney, Agent, or Firm—Oliff & Berridge, PLC

[57] ABSTRACT

A lamination apparatus having an upper platen and a lower platen that open and close to define a lamination chamber therebetween, an electric heater to melt a resin layer of the material to be laminate-molded, a film body provided on the surface of the lower platen, a smooth pressurizing surface formed on the surface of the upper platen, a frame which forms a wall of the lamination chamber in which the material to be laminate-molded is shaped by being clamped between the opposing surfaces of the upper platen and the lower platen, a suction device to depressurize the lamination chamber, a deformable pressurizing plate resiliently interposed between the film body and the material to be laminate-molded and a contact pressurizing mechanism which cause the film body to maintain contact with the surface of the lower platen and separate therefrom to pressurize the material to be laminate-molded through the pressurizing plate pressing against the pressurizing surface of the upper platen.

13 Claims, 11 Drawing Sheets

LAMINATION MOLDING METHOD AND AN APPARATUS THEREOF

BACKGROUND OF THE INVENTION

1. Field of the Invention

The present invention relates to a lamination molding method and a lamination molding apparatus thereof, in more details, a material to be laminate-molded (hereinafter referred to as "the material" comprises a resin layer and a lamination member having convex shapes, wherein a lamination is carried out while the convex shapes of the lamination member is embedded in the resin layer and the surface of the molded products is kept smooth.

2. Description of the Related Art

As an example of the molded products, an IC card is adapted to be embedded with an integrated circuit (IC chip) having an operating and memorizing functions within a plate-like card such as plastic, in addition a magnetic stripe is provided thereon and a necessary information and design are added with engraving such as printing and embossing, or further, the surface is applied with a pear skin. As IC cards, there are a contact type in which a terminal of IC card is exposed on the card surface to be adapted to contact with contact mechanism of such as computer to carry out sending and receiving data, and a non-contact type (wireless) in which, by combining the IC chip and a coil-like antenna and such (hereinafter referred to as "coil") embedded in the IC chip can respond to such apparatus for sending and receiving merely while passing by it. As a substrate for the IC card, in general, a vinyl chloride resin or polyethylene terephtalate (hereinafter referred to as "PET") and such are used as resin layer. And, in order to mold the IC card in lamination, when using PET as a substrate for a plate-like card, it has been carried out to adhere the IC chip or coil to the basic material using an adhesive. Such adhesive forms an embedding layer for the IC chip and the coil. Further, when using a vinyl chloride resin, it has been carried out to melt this vinyl chloride resin layer, thereby, the IC chip and the coil have been embedded in lamination therein.

Thus, in case where, by melting a resin layer and laminate- molding such convex shape which, as it is, becomes as a lamination member like the IC card and the coil, such a molded product having a smooth surface as used for the IC card is molded, a hot vacuum pressure press, as disclosed in Patent Publication Hei 4-52200, has been used.

A vacuum hot press comprises in general a fixed mold, a movable mold which comes close to and separates from the fixed mold for closing and opening molds, a cylinder mechanism enabling the movable mold to be displaced for closing and opening, a plurality of heating plates 30 (see FIGS. 19 and 20) disposed at multiple steps between the fixed mold and the movable mold, a heating means 31 provided in each heating plate 30 to melt a resin layer, a chamber for forming an air-tight chamber which is provided in such a manner as it surrounds the heating plate disposed between the fixed mold and the movable mold and a suction means for depressurizing the chamber to form a vacuum atmosphere in the chamber. Each heating plate 30 is formed from a rigid member, the surface 35 of which, for pressurizing the material, is smooth and not deformable.

For molding the material while embedding it in a resin layer, using such vacuum hot press, first carrying the material between the heating plates 30, 30, forming the air-tight chamber by clamping, depressurizing the air-tight chamber to form a vacuum atmosphere, heating and melting the resin layer of the material by each of the heating plates 30 and pressurizing the material by clamping the movable mold. Thus molded products resin layer is formed in such a manner as the molten resin is pressed by the smooth surface 35 of the heating plate 30, so that its surface is also molded smooth.

On the other hand, as other example of the molded products, there is a circuit substrate for a printed circuit board, which is, in general, formed by overlapping an insulating layer consisting of epoxy resin, phenol resin and thermosetting resin such as polyimide derivative and a copper foil forming an electric conductive layer and laminating those by pressurizing and heating in a single layer, then a given circuit pattern is formed on the electric conductive layer such as copper foil by a post-treatment such as etching. And from the recent request for a miniaturized circuit board, a multiple-layered printed circuit board which is formed in such a manner as through insulating layers many circuit patterns are laminated have been used many times. For laminate-molding of the multiple-layered circuit board, on the circuit pattern formed on the surface of the insulating layer of the circuit board, so called a build-up process, in which further a resin layer which will become an insulating layer and an electrical conductive layer which becomes a circuit pattern are simultaneously or in turn laminated, is carried out. For reference, in general, the shape of each circuit pattern formed in multiple layers through a resin layer having electric insulation property may be different respectively.

By the way, in the case where any resin layer having an insulation property is laminated on the surface thereof, if any air bubble is generated and remained between a circuit substrate on which a circuit pattern is formed and an electric-insulation layer to allow a void to be generated, such voids may swell at the time of a post-process such as a heat-treatment for instance molten solder bath using a high temperature and break an electric-conductive layer laminated or an electric-insulation layer formed from an insulation layer, so that there is anxiety of causing to deteriorate electric-conductivity and insulation. Therefore, in order to prevent any void from being generated, as well as in the molding of the IC card, using a vacuum press it has been carried out to make a laminate molding for a multiple layered circuit substrate under the vacuum atmosphere.

As referred to FIGS. 19 and 20, in the case where an insulation resin layer hb is laminated on the circuit substrate ha formed with a circuit pattern ha2 by the vacuum hot press thus formed as mentioned above, in the stated where the circuit substrate ha and the insulation resin layer hb are overlapped, those are carried in between the heating plates 30, 30 respectively, and the chamber is closed and depressurized by the suction means, to the fixed mold the movable mold is made to come close to clamp the heating plate 30 for pressurizing the circuit substrate ha and the insulation resin layer hb carried in between the heating plates 30, 30, and is heated with the heating means 31. The heated insulation resin layer hb is embedded without voids in the surface of the circuit substrate ha by being molten and fluidized, after that it is solidified due to a chemical reaction occurring at a given temperature. For reference, to the insulation resin layer hb pressurized by the heating plate 30 a resin film layer f is adhered in such a manner as it exists between the heating plate 30 and the insulation resin layer hb. Further, to ensure the mutual insulation property of the insulation layer ha 1 and the circuit pattern ha 2 embedded in the thickness direction of the insulation layer ha 1, the thickness of the insulation resin layer hb is adapted to be settled in such a manner as the thickness of the insulation layer ha 1 after lamination becomes a given value Further, when a given circuit pattern is formed by etching the electric-conductive layer such as copper foil laminated on the surface of the circuit substrate through the insulation layer, a photo-resist forming layer having a photo-sensitive layer is laminated on the copper foil of the surface of the circuit substrate with a laminator, after that, an exposing process for developing the photo-sensitive layer by exposing to an illumination is carried out. In this exposing process, when a light is illuminated on the photo-sensitive layer, if the surface of the copper foil on which the photo-resist forming layer is laminated, further, the surface of the insulation resin layer on which the copper foil is laminated are not smooth, the light to illuminate the photo-sensitive layer is distorted, thereby the circuit pattern is not formed clearly.

For that purpose, in order to form the surface smooth of the insulation resin layer laminated on the circuit pattern formed on the circuit substrate, the heating plate 30 of the vacuum hot press to laminate-mold the circuit substrate has to be also formed with a rigidity member and its opposing surface 35 is made flat.

In the case of forming the above IC card, after molding a vinyl chloride resin is easy to form in working of a pear skin on the surface, engraving and adhering of magnetic tape. However, since the vinyl chloride resin is molten at the time of forming an IC card, necessary information and design are not in advance printed, which has to be carried out by a separated process after molding. Further, it is required to have finished flat in a high level on the surface of the IC card to print any necessary information and any design after molding the IC card. On the other hand, although PET comparing to the vinyl chloride resin is high in its melting point, any necessary information and any design can be printed in advance, it is difficult to work the IC card for such as the pear skin after molding. Therefore, it is a problem to employ PET, accordingly recently, in order to avoid both inconveniences, it has been tried to make use of vinyl chloride resin as the basic material and laminate the IC chip and the coil in the embedding layer of the adhesive.

Further, when pressurizing the material to laminate molding for embedding in the resin layer the lamination member such as IC chip between the heating plates using the above hot press, although it can be molded in its surface smooth, since the heating plate forming a pressure surface has to consist of a highly rigid body not deformable and weighed to some extent, there has been a problem of occurrence of brittle fracture because it is difficult to carry out a fine regulation of the pressurizing force of the cylinder mechanism. In the case where the IC chip as a lamination member is broken, the molded product can not function as IC card at all, so that it has been deteriorated and becomes bad in its yield.

Further, when the heating plate pressurizes the material, the molten resin of the resin layer may be leaked out from the edge of the material, which causes the width and length of the products become large, in addition, the thickness thereof to become thinner than the one set in advance, thereby there can be a problem that the set shape and dimension can not be kept, and there may be a problem to need a post-treatment in taking away such leakage.

Furthermore, due to the shrinkage of the molten resin layer and the flowing of the molten resin around the IC chip or the coil, the sink of the surface of the products is generated and the surface can not keep the flatness. Such products which are deteriorated in flatness have the problem that after molding in IC card the necessary information and design can not be printed. And, since any IC card of vinyl chloride resin can not be printed in advance before molding with the necessary information or the design, it has been a problem where the printing processes of the necessary information and the design are increased.

On the other hand, in the case where, using above hot press, a circuit substrate is laminate-molded, as shown in FIG. 19, on the surface of the circuit substrate ha to be laminated with an insulation resin layer hb, a concavo-convex circuit pattern ha 2 is formed. Therefore, in the case where on one surface of the circuit substrate an insulation resin layer hb is laminate-molded, when the circuit substrate ha and the fluidized insulation resin layer hb are pressurized between the opposing surfaces 35 formed flat of the heating plates 30 having rigidity, as shown in FIG. 20, since the circuit pattern ha 2 of the circuit substrate is adapted to be pressed partially by the surface 35 of the heating plate 30, the circuit substrate ha is deformed and the thickness of the insulation resin layer hb does not become uniform. And, the laminated products taken out from between the heating plates 30 (the circuit substrate laminated with the insulation resin layer), as shown in FIG. 21, while keeping the thickness of the insulation resin layer hb not uniform, the distorted circuit substrate ha returns resiliently to the original shape. When this circuit substrate ha returns approximately to the original shape, the surface of the laminated insulation resin layer hb is distorted as waving and does not become smooth, thereby at the later exposing process of the photo-resist forming layer the light to be illuminated is generated with a distortion and accordingly the light to be illuminated appropriately is adapted to be distorted in its illumination, thereby a problem which causes the circuit pattern ha 2 to be formed not precisely has occurred.

Further, as shown in FIGS. 20 and 21, at the time when the fluidized insulation resin layer hb is pressurized, it is leaked out of the edge of the circuit substrate (sign S in FIG. 20) to cause the thickness of the insulation resin layer ha1 to be thinner, and there has been a problem that the insulation property of the insulation resin layer ha 1 is not ensured, which is caused by a incidental contact of the circuit pattern ha 2 embedded in the thickness direction to generate the deterioration of insulation. In addition, due to the solidifying of the insulation resin layer while being leaked out of the edge of the insulating resin layer hb (sign E of FIG. 21), thereby, there is a problem in which the laminated material can not be formed in a desired dimension and shape.

SUMMARY OF THE INVENTION

The present invention is made to solve the above problems advantageously and one object of the present invention is to provide a lamination molding method and an apparatus in which a convex shape of the lamination member to be laminated is laminated while such convex shape being embedded in the insulation resin layer and that the surfaces of the molded product being kept smooth.

Further, the present invention is to provide a lamination molding method and an apparatus thereof, in which the material can be pressurized uniformly overall and molded avoiding the molten resin layer from being leaked out of the edge, thereby to laminate-mold the product precisely.

Further, another object of the present invention is to provide a lamination molding method and an apparatus thereof, in which, in the state where patterns such as information and design are in advance printed, avoiding this pattern from being displaced, a lamination molding is carried out to simplify the processes and obtain a product with clear printing.

Further, other object of the present invention is to provide a lamination molding method in which a plurality of products are obtained at one time.

Still another object of the present invention is to provide a lamination molding method and a lamination apparatus thereof, in which, even if the lamination member to be laminated is what is apt to generate brittle fracture such as IC chip, without generating brittle fracture, while being embedded in the insulation resin layer, laminate-molding the product having smooth surface can be carried out.

Still other object of the present invention is to provide a lamination molding method and a lamination apparatus thereof, in which, in the case where the lamination member to be laminated is a circuit substrate, in order to form a circuit pattern precisely the insulation resin layer formed with a circuit pattern on the surface is formed smoothly and to be ensured of the insulation property of the insulation resin layer.

Still other object of the present invention is to provide a lamination molding apparatus, in which, in the case where the convex shapes of the lamination member to be laminated are laminated in the resin layer, air bubbles or voids can be prevented from being generated.

The first feature of the present invention is a lamination molding method wherein the material consists of a resin layer and a lamination member to be laminated having convex shapes, the convex shapes of the lamination member to be laminated are laminated by being embedded in the resin layer while the surface of the molded product being made smooth, which method comprises the steps of disposing the material between a pair of smooth pressurizing surfaces at least one of which is resiliently deformable, depressurizing between and around the resin layer and the lamination member to be laminated without pressurizing the resin layer and the lamination member, melting the resin layer while keeping the depressurizing, pressurizing the material at a given pressure with the pair of smooth and pressurizing surfaces and clamping the molds, wherein, initially at pressurizing, allowing at least one of the pressurizing surfaces to be deformed resiliently then as a main clamping process to make the surface of the product smooth due to the resilient restoring of the surface of said pressurizing surface.

The second feature of the present invention is a lamination molding method according to the first feature, wherein the material is pushed to be pressurized by a flexible film body to the pressurizing surfaces having rigidity through the pressurizing-plate consisting of one smooth pressurizing surface deformable resiliently.

The third feature of the present invention is a lamination molding method according to the above features, wherein, before the main clamping process, the initial clamping process for the material with the pressure which can prevent the molten resin from being shrunk is carried out.

The fourth feature of the present invention is a lamination molding method, wherein the material consists of a resin layer and a lamination member having convex shapes, the convex shapes of the lamination member are laminated while being embedded in the resin layer and the surface of the molded product is made smooth, comprising the steps of overlapping the resin layer and lamination member having the convex shapes, disposing the convex shapes of the lamination member between the smooth and pressurizing surface having rigidity and the film body having the flexibility and being provided so as to be pressurized to the smooth and pressurizing surface in such a manner as the convex shapes contact to the film body at the time of being pressurized by the film body, depressurizing without pressurizing the resin layer and the lamination member between and thereabout, melting the resin layer while keeping the depressurizing and pushing to pressurize the resin layer and the lamination member to the smooth and pressurizing surface having rigidity.

The fifth feature of the present invention is a lamination molding method, wherein, in one of the above first to fourth features, the resin layer of the material is what is applied in advance with printings and the surface of such layer is pressurized in the state of contacting to the smooth and pressurizing surface.

The sixth feature of the present invention is a lamination molding apparatus, in which, using the material consisting of a resin layer and a lamination member having convex shapes, lamination molding is carried out, while embedding the convex shapes in the resin layer, in order to mold the surface of the molded product smooth, it comprises an upper platen and a lower platen, which face each other and are provided in such a manner as these can come close and separate relatively, a melting means to melt the resin layer and a pair of smooth pressurizing surfaces at least one of which is resiliently deformable.

The seventh feature of the present invention is a lamination molding apparatus, in the six feature of the present invention, in which a controlling means to control for changing the initial clamping process for pressurizing a pair of smooth pressurizing surfaces to the material at the pressure which can prevent the molten resin from being shrunk and the main clamping process for pressurizing the pair of smooth and pressurizing surface to the material, while embedding and laminating the convex shapes of the lamination member in the resin layer, at the pressure under which the surface of the product can be molded smooth.

The eighth feature of the present invention is a lamination molding apparatus which comprises, in either one of the sixth and seventh features, further an air-tightly closed chamber and a suction means for depressurizing the closed chamber.

The ninth feature of the present invention is a lamination molding apparatus which comprises, in the eighth feature of the present invention, a film body having flexibility provided on at least either one of opposing surfaces of the upper platen and the lower platen, a frame to form a molding space by being surrounded with the opposing surfaces of the upper platen and the lower platen and a contacting and pressurizing means to make the film body contact arbitrarily to the one of the opposing surfaces of the upper platen and lower platen on which the film body is provided and separate the film body from the opposing surface and pressurize the material between the film body and a smooth surface formed on the other opposing surface of the upper platen or lower platen.

The tenth feature of the lamination molding apparatus is characterized in that, in the ninth feature of the present invention, the dimension of the pressurizing plate is adapted to be approximately identical with the one of molded product.

The eleventh feature of the present invention is a lamination molding apparatus in which, in one of the sixth to tenth features, the lamination member of the material has a possibility of brittle destruction and is of a convex shape.

The twelfth feature of the present invention is a lamination molding apparatus in which, in one of the sixth to eleventh features, the resin layer of the material is what is applied with a printing on the surface thereof, wherein the printed surface is pressurized in contact with the smooth pressurizing-plate.

The thirteenth feature of the present invention is a lamination molding apparatus in which, in one of the sixth to tenth features, the lamination member of the material is a circuit substrate the surface of an insulation layer of which is formed with a circuit pattern as a convex shape, and the resin layer has the insulating property.

Next, according to each feature of the present invention, hereinafter it is described how to practise the present invention.

According to the first feature, in the time of lamination molding of the resin layer on the material having convex shapes, first, the material is disposed between the smooth and pressruizing surfaces in the state where the material and the lamination member are overlapped. And, in the state where depressurizing is carried out between the material and the lamination member and therearound to produce a vacuum atmosphere, the resin layer is molten and a main clamping process to pressurize the material at a given pressure by a pair of smooth and pressurizing surfaces is carried out. Then, the smooth pressurizing surfaces able to be deformed resiliently are, initially at pressurizing, resiliently deformed in accordance with the convex shapes, then by the resilient restoring of the pressurizing surfaces the molten resin layer flows around the convex shapes in such a manner as it is pushed to laminate-mold the material and the resin layer completely in a unit and obtain a molded product being smooth in the surface.

According to the second feature, by pressurizing the material to the pressurizing surface having rigidity with the film body having flexibility through the resiliently deformable pressurizing-plate, the material is pressurized.

According to the third feature, in advance to the main clamping process, by carrying out initial clamping process the molten resin layer is prevent from being shrunk due to melting.

According to the fourth feature, when laminate-molding the lamination member to the material having the convex shapes, initially, the material being in the state where the material and the lamination member are overlapped is disposed between the smooth and pressurizing surface and the film body having flexibility and being provided able to pressurize against the smooth pressurizing surface in such a manner as the convex shapes of the material are in contact with the film body at the time of being pressurized. And, in the state where depresurizing process is carried out between the material and the lamination member and around thereabout to produce the vacuum atmosphere, the resin layer is molten, and by the film body the lamination member and the material are pushed and pressurized to the smooth pressurizing surface having rigidity. At that time, in the state where the film body having flexibility is deformed in accordance with the convex shapes of the material, due to the fact that the resin layer is pressurized to the smooth and pressurizing surface, a molded product with a smooth surface is molded.

According to the fifth feature, when pressurizing the material, although the resin layer has fluidity due to being molten, the surface of the resin layer applied with printing is stopped in fluidity due to the contact with the pressurizing surface while being pressurized, so that the printing is indicated clearly without being displaced and distorted.

According to the sixth feature, when laminate-molding the material and the lamination member using the lamination molding apparatus, initially the material in the state where the material and the lamination member are overlapped is disposed between a pair of smooth pressurizing surfaces, at least one of which is deformable resiliently. And, the resin layer is molten and the material is pressurized by a pair of smooth and pressurizing surfaces at a given pressure. Then, the resiliently deformable smooth and pressurizing surface, initially at pressurizing, is deformed resiliently in accordance with the convex shapes of the material, then by the resilient restoring of the pressurizing-surface the molten resin layer flows around the convex shapes in such a manner as it is pushed to laminate-mold the material and the resin layer completely in a unit and obtain a molded product being smooth in the surface.

According to the seventh feature, the control means control the initial clamping process to carry out for pressurizing the material at the pressure which can prevent the molten resin layer from being shrunk, after that, laminate the convex shapes of the material while embedding those in the resin layer so as to clam the material for pressurizing at the pressure which can mold the surface of the molded product smooth. The initial clamping process prior to the main clamping process can prevent the resin layer from being shrunk due to melting.

According to the eighth feature, the material is accommodated and disposed in the molding space closed air-tight and the space is depressurized by the suction means. And the material the lamination member of which is molten is pressurized by a pair of smooth pressurizing at the given pressure. Since the material is pressurized under vacuum atmosphere, the resin layer is prevented from generating air-bubbles and voids.

According to ninth feature, at the time when the suction means depressurize the molding space formed with the frame, the contacting and pressurizing means control the film body so as to make it contact to the opposing surface tightly. For that purpose, without pressurizing the resin layer and the material, therebetween and around there it is depressurized. And, when pressurizing the material, the contacting and pressurizing means control the film body to separate from the opposing surfaces. The material is pressurized by the film body between the pressurizing surfaces.

According to the tenth feature, the resin layer of the material is formed smaller than the pressurizing-plate and the material is pressurized by the pressurizing-plate having an approximately identical dimension with the molded product having a given dimension. The molten resin layer is enlarged to an approximately identical dimension with the pressurizing-plate by being pressurized.

According to the eleventh feature, initially at the time of being pressurized, the smooth and pressurizing surface is deformed resiliently in accordance with the convex shapes of the material, and hereafter due to resiliently restoring of the pressurizing surface the molten resin layer flows and since the lamination member having a possibility of brittle destruction is embedded in the resin layer, the material is not overloaded avoiding the generation of brittle destruction, so that the material is firmly and securely laminate-molded with the lamination member to obtain the smooth surface of the molded product.

According to twelfth feature, at the time of pressurizing the material, although the resin layer is molten and has fluidity, by pressurizing the printed surface of the resin layer while contacting to the pressurizing surface, the flow of the surface of the resin layer is stopped, thereby displacing and distortion of the printing are not generated to obtain a clear printing.

According to thirteenth feature, initially at pressurizing, the smooth and pressurizing surface is resiliently deformed in accordance with the circuit pattern formed on the surface of the insulation layer, and after that, since the circuit pattern is embedded in the resin layer by the flow of the molten insulation layer due to resiliently restoring of the pressurizing surface, the material is laminate-molded securely with the resin layer and that the surface of the molded product is molded smooth.

EMBODIMENT

The lamination molding method and embodiments of the lamination molding apparatus will be explained in detail based on the attached drawings. In figures, identical signs indicate the identical or corresponding portion. First, the first embodiment of the lamination molding method and apparatus is explained based on FIGS. 1–5. For reference, in this embodiment, the lamination member of the material H1 is an IC chip or the coil (hereinafter referred to as "IC chip etc.") h1 and the product molded in being embedded with the IC chip etc. h1 is an IC card, the laminate-molding apparatus is explained in accordance with the case where one of the pair of smooth pressurizing plates is formed with a resiliently deformable pressurizing plate 8 is pressurized by a film body 4 provided on either one of the opposing surfaces of the upper platen 1 and the lower platen 2.

Figure 1:
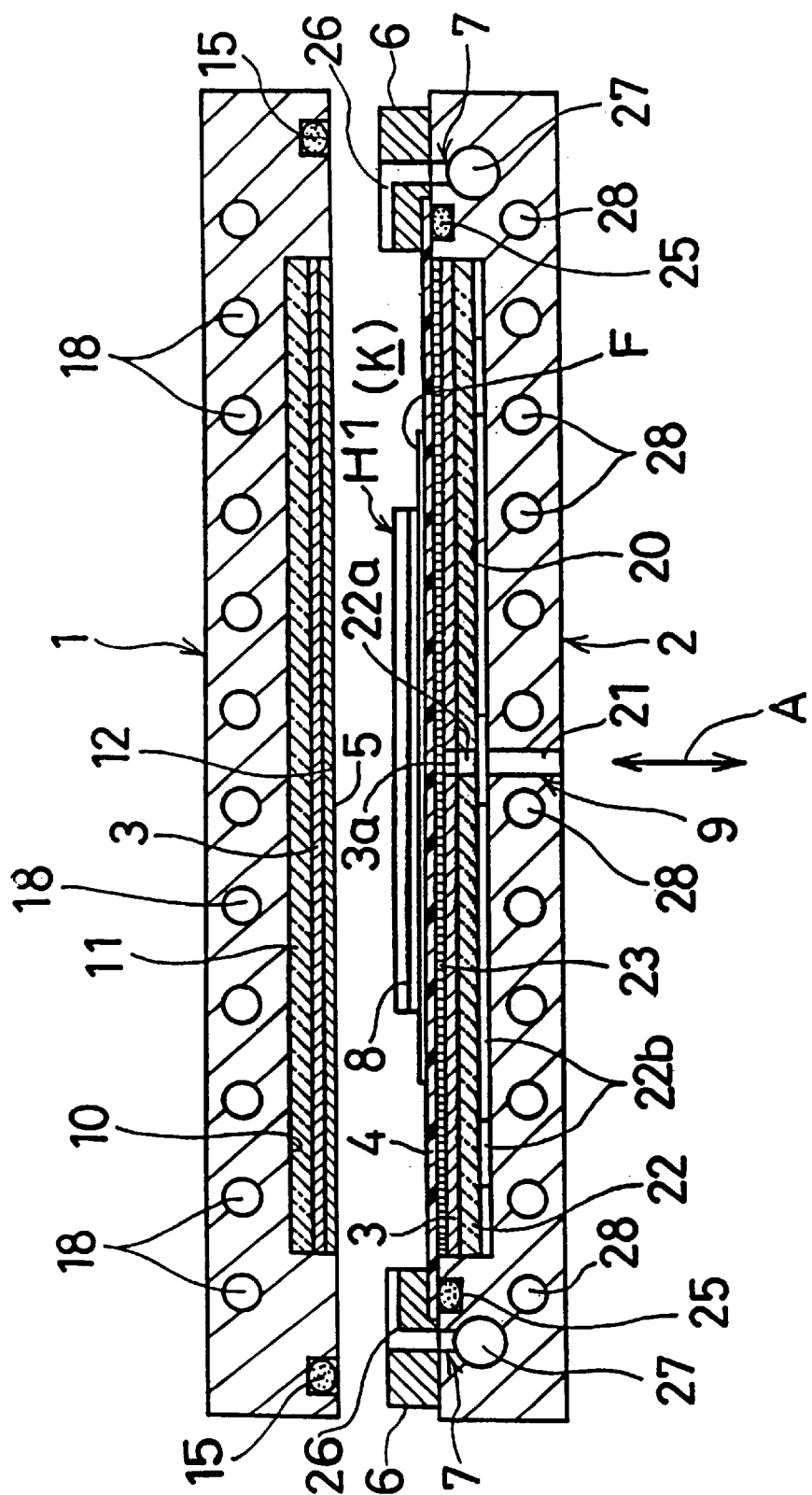
FIG. 1 is a sectional view of the first embodiment of the lamination molding apparatus of the present invention.

The lamination molding apparatus of the present invention, as shown in FIG. 1, in general, while the material H1 comprises the IC chip etc. h1 and the resin layer h2 (see FIG. 2), is the one for laminate-molding the IC chip etc. h1 in such a manner as, in order to make the surface of the molded product smooth, it is embedded in the resin layer h2. The apparatus comprises an upper platen 1 and a lower platen 2 which are provided facing each other and being able to come close to and separate from relatively, a melting means 3 to melt the resin layer h2, a film body 4 provided on either one of the upper platen 1 or lower platen 2, a smooth and pressurizing surface 5 having rigidity and provided on another one of the opposing surfaces of the upper platen 1 and the lower platen 2, a frame body 6 forming an air-tightly closed molding space K for accommodating the material H1 by being clamped between the opposing surfaces of the upper platen 1 and the lower platen 2, a suction means 7 to depressurize the molding space K, a pressurizing-plate 8 interposed between the film body 4 and the material H1 and being able to be resiliently deformable as another pressurizing surface and a contact pressurizing-plate 9 arbitrarily contacting the film body 4 to the one of opposing surfaces of the upper platen 1 and the lower platen 2 on which the film body 4 is provided and separating the film body 4 therefrom, and pressurizing the material H1 between another smooth pressurizing-plate 5 formed on either one of the opposing surfaces of the upper platen 1 or lower platen 2 through the pressurizing-plate 8.

Further, the lamination apparatus of the present invention is the one in which, the dimension of the pressurizing-plate 8 is a little bit larger than the material H1 and approximately identical with the molded product.

In this embodiment, the upper platen 1 is fixed, the lower platen 2 is supported with an elevator means (omitted), and the lower platen 2 is structured in such a manner as it comes close to and separate from the upper platen 1 and the smooth pressurizing-surface 5 is formed on the upper platen 1. However, in the lamination molding apparatus of the present invention, in order to enable the upper platen 1 and the lower platen 2 to come close and separate relatively, the lower platen 2 may be fixed and the upper platen 1 may be made to move up and down, or both of the upper platen 1 and the lower platen 2 may be made to move up and down. Also, it is possible to provide the film body 4 on the opposing surface of the upper platen 1 and the smooth and pressurizing-surface 5 can be provided on the lower platen 2.

Figure 2:
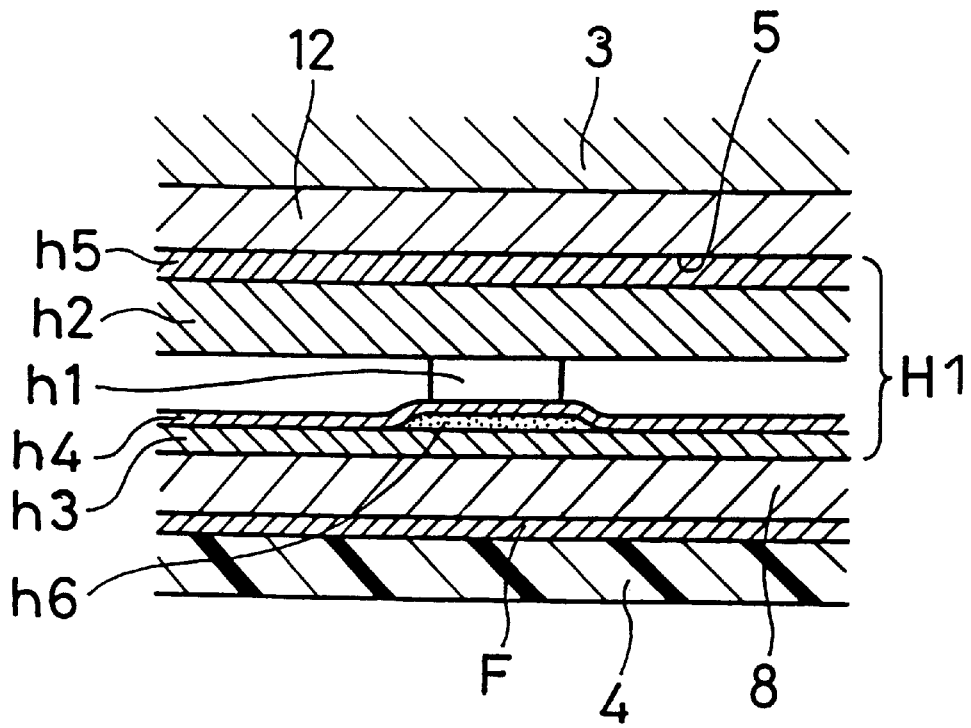
FIG. 2 is a partially enlarged view showing the prior state where the IC chip is embedded in the resin layer.

The material H1, in this embodiment, as shown in FIG. 2, the IC chip etc. h1 is connected to a circuit pattern h4 adhered to the resin layer h3 and comprises a resin film layer h5 coated with a resin layer h2. Between a resin film layer h3 corresponding to the portion to which the IC chip etc. h1 is connected and the circuit pattern h4, in order to protect the connection portion of the IC chip etc. h1 and the circuit pattern h4, a hot melt h6 which is solidified at the room temperature and molten by heating is interposed. For reference, the circuit pattern h4 is sometimes coated with the resin layer h2. Both of the resin film layers h3 and h5 can be spread consecutively to the left and right ends of the frame 6 in FIG. 1, or it can be accommodated in its length, in the frame 6, i.e. in the molding space K intermittently. For reference, the lamination molding apparatus of the present invention, as shown in FIG. 5 for instance, can be applied for another type of the material H1 such as consisting of the material H1 clamped with resin film layers h7 and h8 of the same material, and such film layers h7 and h8 are molten to embeded the IC chip etc. h1 in the resin film layers h7 and h8. Further, a sign h4 which is connected to the IC chip etc. h1 shown in FIGS. 2–4, in the case where the molded product is used in the wireless IC card, may become an electric conductive wire to be used as an antenna in place of a circuit pattern.

The upper platen 1 is of an approximately rectangular and plain plate-like, which is formed in such a manner as it has a recessed portion 10 on its lower side opposing to the lower platen 2 and having the same opening corresponding to the inner opening of the frame 6. In this recessed portion 10, a sheet-like electric heater 3 as a melting means to melt the resin layer h2 (h7, h8) is accommodated, and below the heater 3 a base 12 to form a smooth pressurizing-surface 5 consisting of opposing surface of the upper platen 1 is provided. At the position corresponding to the frame 6 located on the outer circumference of the recessed portion 10, a seal member 15 is provided to seal the molding space K air-tightly when the molding space K is formed.

The lower platen 2 is made approximately rectangular and plain plate-like as well as the upper platen 1, and is formed of a recessed portion 20 approximately identical in dimension to the inner opening of the frame 6. Approximately at the center of the lower platen 2, a path 21 as a part of the contact-pressurizing means 9 is pierced in such a manner as it comes through the recessed portion 20. In the recessed portion 20, a heat insulating member 22, the electric heater 3 of a sheet-like as the melting means for melting the resin h2 (h7, h8) and an air penetrating member 23 are accommodated. The air penetrating member is made from, for instance, a plain and porous plate like a punching metal, which spreads all over the opening of the recessed portion 20, is interposed between the film body 4 and the electric heater 3 and is disposed in such a manner as it forms a surface continuous to the opposing surface of the lower platen 2. Between the circumferential sides of the heat insulating member 22 and the electric heater 3 and the side wall of the recessed portion 20, a gap (not shown) is formed, at the approximately central portions of the heat insulating member 22 and the electric heater 3 holes 22a and 3a are provided so as to communicate with the path 21 respectively, and at the contacting surface of the heat insulating member 22 to the bottom surface of the recessed portion 20 a lattice-like grooves 22b are formed in such a manner as these are opened to the side of the heat insulating member 22 communicated with the path 21. For reference, in this embodiment the present invention is explained in exemplifying the lattice-like grooves 22b, but it is not limited to that embodiment if that can be communicated in air with the gap between the side wall of the recessed portion 20 of the lower platen 2 and the circumferential side surfaces of the heat insulating member 22 and the electric heater 3, and the path 21 as a part of the contact-pressurizing means 9.

The film body 4 is made from such material as, for instance, silicon gum, fluorine gum having flexibility, resiliency, elasticity and heat resistance, and fixed to one surface of the frame 6 by sintering on its circumferential edge in such a manner as covering allover the inner opening of the frame 6.

The frame 6 is arranged in its thickness in such a manner as it can form a molding space K having an appropriate height sufficient to accommodate the material H1 when it is clamped between the upper platen 1 and the lower platen 2 by being displaced to come close relatively. The frame 6, in this embodiment, is mounted removably on the lower platen 2 in such a manner as the film body 4 contacts to the opposing surface of the lower platen 2.

At the position of the lower platen 2 corresponding to near the outer circumference of the film body 4 being fixed to the frame 6, a seal member 25 for keeping fluidity-tight between the film body 4 and the recessed portion 20 of the lower platen 2 is provided.

The suction means 7, in this embodiment, is structured from a path 26 formed so as to open to the inner circumference of the frame 6, an exhaustion path 27 provided on the lower platen 2 being communicated with the path 26 and a depressurizing means (not shown) such as a vacuum pump connected by the exhausting path 27. For reference, the suction means 7 of the present invention is not limited to the above embodiment, for instance, although not shown, the other means may be employed as long as such means can depressurize the mold space K when the space is formed, such as it can be provided at the position in such a manner as the exhausting path connected by the depressurizing means opens avoiding the portion of the material H1 located on the opposing surface of the upper platen 1 to which the pressurizing pressure is applied.

The pressurizing-plate 8, in this embodiment, is made from a stainless plate having the thickness of 1–2 mm, and is made to the approximately same dimension of the length and the width of the material H1. The resiliency at the time of deformation of the pressurizing-plate 8 can be regulated by the thickness.

In the embodiment shown in FIG. 2, the pressurizing-plate 8 is put on the film body 4 through a releasing film F as a releasing member, on which the resin film layer h3 having the IC chip h1 and the circuit pattern h4 is put, and on the IC chip h1, the resin film layer h5 coated with the resin layer h2 is put. The releasing film F, as shown in FIG. 4, is provided according to the necessity (unnecessary case can be) for avoiding that the molten resin layer h2, at the time of pressurizing the material to the smooth surface 5 of the base 12 by the film body 4, is leaked (pushed) out by being pressurized and this leaked out resin is adhered to the film body 4, and at least it has a dimension under which it can be interposed between the end face of the resin layer h2 and the film body 4. Further, as shown in FIG. 5, in the case where the material H1 is formed with the type of disposing the IC chip h1 by being clamped between the resin film layer h7 and the resin film h8 made from the same material to the material H1, the releasing film F is disposed between the resin film layer h7 and the smooth surface 5 and between the resin film layer h8 and the pressurizing plate 8 in such a manner as it is projected from the edges of the resin film layers h7, h8 so as to cover the end faces of the resin film layers h7, h8.

Figure 3:
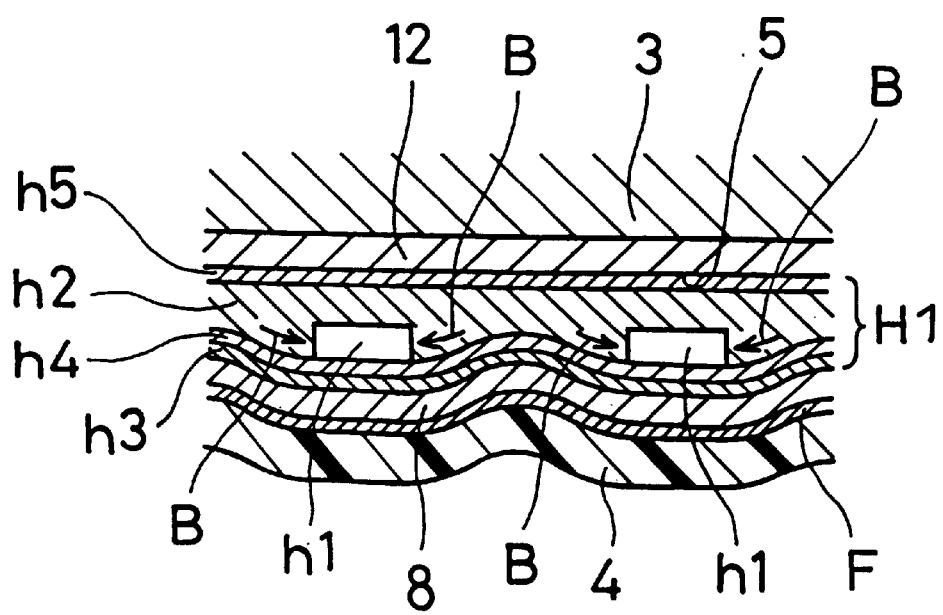
FIG. 3 is for explanation of the state where by the resilient deformation of the pressurizing plate due to the resistance when IC chip is embedded in the resin layer, the resin layer is flows and helps the IC chip to be embedded.
Figure 4:
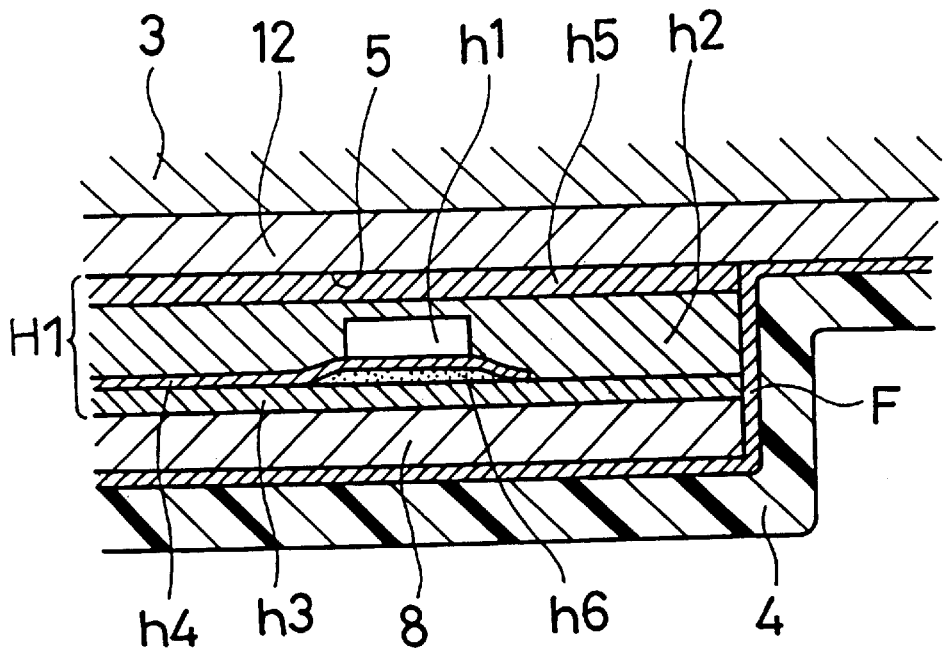
FIG. 4 is a partially enlarged and sectional view, in which IC chip is embedded in the resin layer, the end face of the resin layer is held by the film body in such a manner as it is covered with the film body and in the state where the resin layer is prevented from being spread from the edge, the surface of the molded product is molded smooth.
Figure 5:
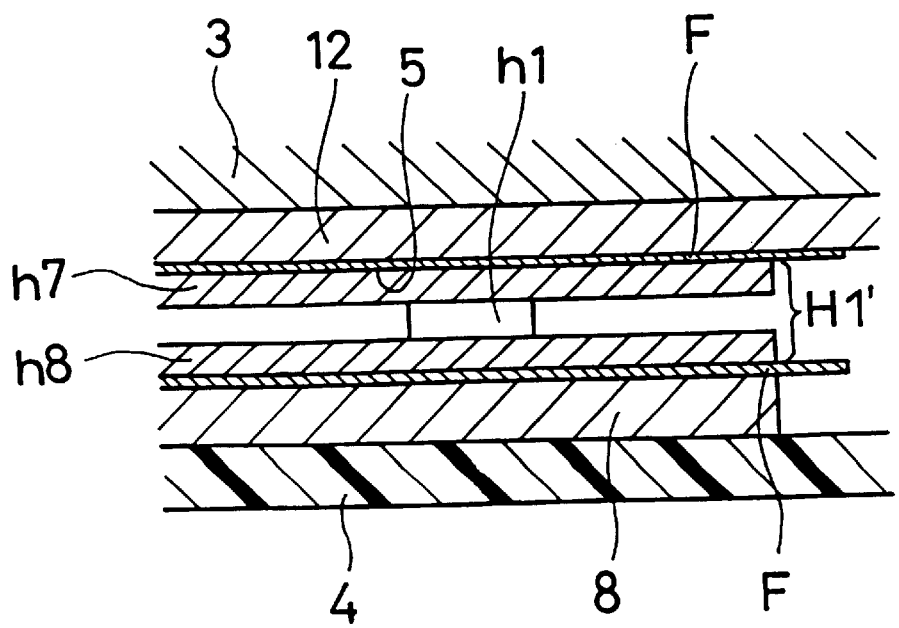
FIG. 5 is a sectional view of the example where the material is clamped between the film-like resin layer.

For reference, the lamination molding apparatus of the present invention is not limited to the illustrations of the material H1 shown in FIGS. 2–4, but it may be realized in such a manner as the resin film layer h5 having the resin layer h2 is put on the pressurizing plate 8 and the IC chip h1 connected to the circuit pattern h4 adhered to the resin film layer h3 is put on the resin film layer h2.

The contact pressurizing means 9 is what is formed in such a manner as, to the path 21 formed opening to the recessed portion 20, the depressurizing means such as vacuum pump and a compressed air supply source (not shown) such as an air compressor are connected arbitrarily changeably, and as shown in FIG. 1 by an arrow A, it is arranged in such a manner as the air in the recessed portion 20 is sucked through the path 21 or reversely the air is supplied in the recessed portion 20. When the air is sucked or supplied in the recessed portion 20 through the path 21, as mentioned above, such operation is effected evenly all-over the film body 4 through the holes 22a, 3a formed on approximately at the center of the heat insulating member 22 and the electric heater 3, a plurality of grooves 22b formed lattice-like on the heat insulating member 22 and the gap between the cicumferential side surface of the heat insulating member 22 and the side wall of the electric heater 3.

The depressurizing means of the contact pressurizing means 9 can be used together for changeably with the depressurizing means of the suction means 7, its depressurizing ability is arranged in such a manner as it becomes larger than the depressurizing ability of the suction means 7. Further, the pressurizing force to the smooth surface of the material H1 by the film body 4 through the contact pressurizing means 9 due to the compressed air supply source is settled, for instance, to 1–11 kg/cm$^2$, according to this pressurizing force a resilient deformation volume of the pressurizing plate 8 is adapted to be regulated in its original thickness.

For reference, as shown in FIG. 1, inside the upper and lower platens 1 and 2, temperature controlled fluid channels 18, 28 for passing the temperature controlled fluid are provided respectively. At least in either one of the temperature controlled fluid channels 18, 28, a cooling water as a temperature controlled fluid is adapted to be flown to cool the finished molded-product. Thereby, a molded product cooling means is arranged. This cooling means is not limited to such structure as the cooling water is flown in the temperature controlled fluid channels 18, 28, but other means may be used.

Further, in this embodiment, it is explained by exemplifying the electric heater 3 to melt the resin layer, but as a supplemental heat source or as in place of the electric heater 3, the temperature controlled fluid such as vapor which is heated to the appropriate temperature may be flown exchangeably with the cooling water through at least one of the temperature controlled channels 18, 28 of the upper platen 1 and the lower platen 2.

Further, in this embodiment, it is explained by exemplifying the case where the smooth surface 5 is formed on the opposing surface of the upper platen 1 and the film body 4 is provided on the opposing surface of the lower platen 2, but the present invention is not limited to it. For instance, although not shown in figures, reversely to the above embodiment, the base 12 may be provided in the recessed portion 20 of the lower platen 2, in the recessed portion 10 of the upper platen 1 the air penetrating member 23 and the path 21 may be provided, and the frame 6 is mounted removably on the upper platen 1 in such a manner as the film body 4 may become in contact with the opposing surface of the upper platen 1 and the exhaustion path 27 may be provided in the upper platen 1 so as to be in communication with the path 26 of the frame 6. In this case, a gap between the circumferential sides of the heat insulating member 11 accommodated in the recessed portion 10 of the upper platen 1 and the electric heater 3 and the side wall of the recessed portion 10 is formed, holes are formed on the heat insulating member 11 and the electric heater 3 respectively, so as to be in communication with the path 21 and a plurality of grooves are formed so as to be opened to the side of the heat insulating member and in communication with the path 21. And when using thus formed lamination molding apparatus, in the state where the IC chip h1 and the resin layer h2 are overlapped, the pressurizing-plate 8 is put on either one of the resin film layer h3 or h5 (or h7 or h8 shown in FIG. 5) and make the pressurizing-plate 8 is made interpose between the material H1 and the film body 4. And, according to the necessity, the releasing film F is made to interpose at a given position.

Next, the first embodiment of the lamination molding method of the present invention is explained in detail using the lanination molding apparatus to obtain the molded product for use of the IC card by laminate-molding the IC chip in embedding as shown in FIG. 1 in accordance with the case where the material H1 constituted as shown in FIGS. 2–4 is laminate-molded in embedding.

The lamination molding method in which the material H1 has the IC chip h1 and the resin layer h2 and the laminate-molding is carried out so as to make the surface of the molded product smooth comprises, in general, of the steps of disposing the pressurizing-plate 8 able to be resiliently deformed so as to be interposed between the material H1 and the film body 4, depressurizing between the IC chip h1 and the resin layer h2 and around less than 1 atmosphere without pressurizing the IC chip h1 and the resin layer h2, melting the resin layer h2 while maintaining this depressurization, pressurizing the material H1 through the pressurizing-plate 8 to the smooth surface 5 while being pushed by the film body 4 and laminate-molding the material H1 while embedding the IC chip h1 in the resin layer h2 to mold the surface of the molded product smooth.

When finishing the molded product, initially, the releasing film F, the pressurizing-plate 8 having the approximately same dimension to the material H1, the IC chip h1 and the resin layer h2 are put on the film body 4 in the state where these are overlapped in turn from the below. And, by making the lower platen 2 displace to come close to the upper platen 1, the molding space K in which the material H1 is accommodated is formed by clamping the frame 6 between the opposing surfaces of the upper and lower platens 1 and 2. This molding space K is sealed air-tightly due to the contact of the seal member 15 to the frame 6. Further, the recessed portion 20 of the lower platen 2 is the space kept in air-tight sealing due to the contact of the film body 4 to the sealing member 25.

Next, the air in the recessed portion 20 is sucked through the path by driving the depressurizing means of the contact-pressurizing means 9, making the film body 4 contact air-tightly to the surface (opposing surface of the lower platen 2) of the air-penetrating member 23. Then, since the air between the air penetrating member 23 and the film body 4 is sucked through the holes 22a, 3a provided at approximately central portion of the heat insulating member 22 and the electric heater 3, a plurality of latitice-like grooves 22b formed on the heat insulating member 22 and the gap formed between the circumferential sides of the heat insulating member 22 and the electric heater 3 and the side wall of the recessed portion 20, the film body 4 is adapted to contact air-tightly to the allover surface of the air penetrating member 23.

In this state, by operating the not-shown depressurizing means of the sucking means 7, the inside of the molding space K is depressurized less than 1 atmosphere through the path 26 formed so as to open to the inner circumferential edge of the frame 6 and the exhaustion path 27. Since the film body 4 contacts air-tightly to the air penetrating member 23 and the molding space K is depressurized, the film body 4 does not happen to swell by chance to pressurize the resin layer h2 and the IC chip h1.

While keeping this depressurization in the molding space K, by the electric heater 3 or by flowing the temperature controlled fluid such as vapor heated at a given temperature in the temprature controlled fluid channels 18, 28, the resin layer h2 is heated and molten.

After, the contact pressurizing means 9 is changed from the suction operation to the supplying of the compressed air by the compressed air supplying source such as air compressor not shown. The compressed air of the compressed air supplying source is supplied in the recessed portion 20 through the path 21 under a given pressure. Since the compressed air supplied in the recessed portion 20 flows through the holes 22a, 3a formed at approximately central portion of the heat insulating member 22 and the electric heater 3 respectively, the plurality of grooves 22b formed lattice-like on the heat insulating member 22 and the gap between the circumferential sides of the heat insulating member 22 and the electric heater 3 and the side wall of the recessed portion 22, that flow can operate evenly on allover the film body 4 to swell evenly the film body 4

When the film body 4 is swollen in the state where the resin layer h2 is molten, the material H1 is pressurized to the smooth surface 5 of the upper platen 1 by the film body 4 through the pressurizing-plate 8. Initially, the IC chip h1 is not embedded instantly in the molten resin layer h2 due to the fluidity resistance of the molten resin layer h2, the portion not contacted to the IC chip h1 rather than the portion contacted to the IC chip h1 is deformed within resiliency in such a manner as it is pushed more in the molten resin layer h2. However, as shown in FIG. 3 at arrow B, due to the pushed-in state of the pressurizing plate 8 where the portion not contacted to the IC chip h1 is deformed resiliently, the resin of the molten resin layer h2 flows around the IC chip h1 like being pushed out, which helps the embedding of the IC chip h1 in the resin layer h2. And, due to the further flow of the resin of the further molten resin layer h2 and the reslient restoring of the pressurizing plate 8, as shown in FIG. 4, the molded product is pressurized by the film body 4 between the smooth surface 5 of the platen 1 and the pressurizing plate 8 which is restored to the original plain plate-like to mold the product smooth in both surfaces. Further, at the time when pressurizing the material H1, since the atmosphere between the resin layer h2 and the IC chip h1 and thereabout is depressurized less than 1 atmosphere, there is no occurrence of any void in the molded product. On the other hand, as shown in FIG. 4, the releasing film F is interposed between the material H1, the pressurizing plate 8 and the film body 4 in such a manner as the releasing film F covers the end faces of the material H1 and the pressurizing plate 8. Thereby, the resin of the molten resin layer h2 is not leaked out from the edge or does not adhere to the film body 4. Accordingly, there is no anxiety of deterioration such that the film body 4 is contaminated with the molten resin, and, in the product precision that the thickness of the molded product becomes thinner than the settled value due to being leaked out of the resin from the edge and that the dimension of the product in length and width and such becomes larger than settled one.

At finishing the molding, as an example, by flowing the cooling water through the temperature controlled fluid channels 18, 28 provided at least in the upper platen 1 or in the lower platen 2, the molded product is cooled. And then, the not shown depressurizing means of the suction means 7 is stopped in operation and the air is supplied in the molding space K from the path 26 so as to release the molding space K from depressurized state through the exhausting path 27. Further, by freeing the given compressed air which has been supplied in the recessed portion 20 into the atmosphere, or again by operating the depressurizing means of the contact pressurizing means 9 the air in the recessed portion 20 is sucked to contact the film body 4 to the surface of the air penetrating member 23 tightly. Thereafter, by displacing the lower platen 2 to separate the lower platen 2 from the upper platen 1 the molding space K is released to take out the product. In this embodiment, the cycle of the lamination molding of the material is shortened by cooling the molded product by flowing the cooling water through the temperature controlled fluid channels 18, 28.

Next, another embodiment of the lamination molding method is explained based on the case where the material H1 structured as shown in FIG. 5 is laminate-molded in embedding manner. For reference, the same signs used in the above mentioned embodiment are used for the same or corresponding parts in this embodiment, and the explanation thereof is omitted. The lamination molding method of this embodiment of the present invention, in general, is for laminate-molding in such a manner as the material H1 having IC chip h1 and the film-like resin layers h7, h8 is laminate-molded smooth in the surface of the molded product while the IC chip h1 being embedded in the film-like resin layers h7, h8. That is, the film-like resin layers h7, h8 in this embodiment replaced the resin layer h2 and the resin film layers h3 and h5.

The material H1 is made from what is formed by clamping the IC chip h1 between the film-like resin layers h7 and h8 of the same raw material to the material H1. The thickness of the film-like resin layers h7, h8 is set, when being overlapped each other, in such a manner as it becomes thicker than the thickness of the IC chip h1. For reference, in FIG. 5, although the circuit pattern and h4 such as antenna are omitted, the circuit pattern and such h4 may be adapted to be disposed between both of the film-like resin layers h7, h8 with the IC chip h1.

When using the lamination molding apparatus shown in FIG. 1, in the state where the material H1 is overlapped while the pressurizing plate 8 being made to be positioned lower and being clamped with the releasing film F, the material H1 is put on the film body 4 provided on the opposing face of the lower platen 2. Further, in the case where the lamination molding apparatus is arranged with the film body 4 provided on the opposing face of the upper platen 1 and the smooth surface 5 formed on the lower platen 2, in the state where the pressurizing plate 8 is overlapped with the material H1, which is adapted to be positioned lower and clamped with the releasing film F, the material H1 is put on the smooth surface 5 of the lower platen. And, by making the upper platen 1 and the lower platen 2 displace relatively, the molding space K is formed with the smooth surface 5 of the upper platen 1, the film body 4 provided on the opposing surface of the lower platen 2 and the frame 6. Next, in the state where, by the contact pressurizing means 9, the film body 4 is made contact to the opposing surface of the lower platen 2, the suction means 7 depressurizes the molding space K to less than 1 atmosphere. Then, by the electric heater 3 etc. the film-like resin layers h7, h8 are made to be molten and the material H1 is pressurized to the smooth surface 5 of the upper platen 1 through the pressurizing plate 8 by swelling the film body 4 in such a manner as it is separated by the contact pressurizing means 9 from the opposing surface of the lower platen 2.

Initially, when the material H1 is pressurized, the IC chip h1 is not embedded instantly due to the fluidity resistance of the molten film-like resin layers h7, h8 and the portion of the pressurizing-plate 8 which is not in contact with the IC chip h1 is adapted to be deformed resiliently within the limit of resiliency so as to push the film-like resin layer h8. And, the IC chip h1 is pushed in by the film-like resin layer 7 and the molten resin layer h8 flows around the IC chip h1 like being pushed out to help the IC chip h1 to be embedded in the lamination molding. Further, due to the flow of the molten film-like resin layers h7, h8 and the resilient restoring of the pressurizing-plate 8, the molded product i.e. IC chip h1 is laminate-molded in embedding between the film-like resin layers h7, h8 without brittle desctruction, and that the product is pressurized by the film body 4 between the smooth surface 5 of the upper platen 1 and the pressurizing plate 8 restored to the original, smooth and plain plate to mold both surfaces smooth. Similarly, with the above embodiment explained on FIG. 4, there is no deterioration in the molding precision due to the molten resin leaked out from the edge.

Figure 6:
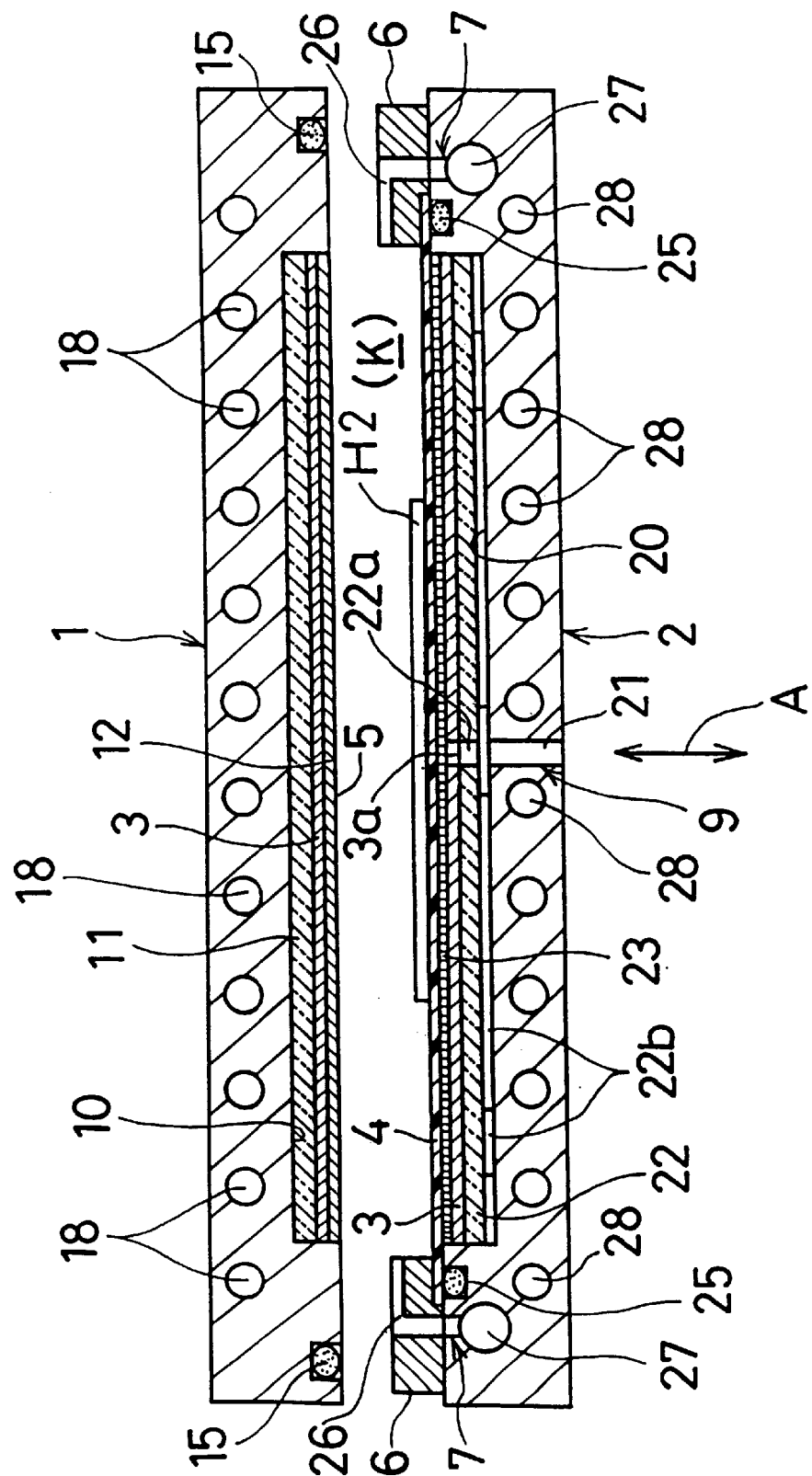
FIG. 6 is a sectional view showing the second or third embodiment of the lamination molding apparatus of the present invention.

Next, the second embodiment of the lamination molding method and apparatus of the present invention is explained based on FIGS. 6–9 according to the case where a circuit substrate is used for laminate-molding. Now, in this embodiment, the signs same and corresponding to the parts of first embodiment are used as well and the explanation thereof is omitted. The lamination molding apparatus of the present invention, as shown in FIG. 6, in general, comprises of the upper platen 1 and the lower platen 2 which are provided in opposing manner so as to be able to relatively come close and separate, the melting means 3 for melting the resin layer hb having the insulation property, the film body 4 having the flexibility and being provided on either one of the opposing surfaces of the upper platen 1 or the lower platen 2, the smooth surface 5 having rigidity and being formed on another opposing surface of the upper platen 1 or lower platen 2, the frame 6 which forms the molding space K where the material H1 is accommodated by being clamped air-tightly with the surfaces of the upper platen 1 and the lower platen 2, the suction means 7 for depressurizing the molding space K and the contact pressurizing means 9 for making the film body 4 to contact to either one of the opposing surfaces of the upper platen 1 or the lower platen 2 on which the film body 4 is provided, separate from another opposing surface of the upper platen 1 or the lower platen 2 and pressurize the material H2 between the film body 4 and the smooth surface 5 formed on either one of the opposing surfaces of the upper platen 1 or the lower platen 2.

Figure 7:
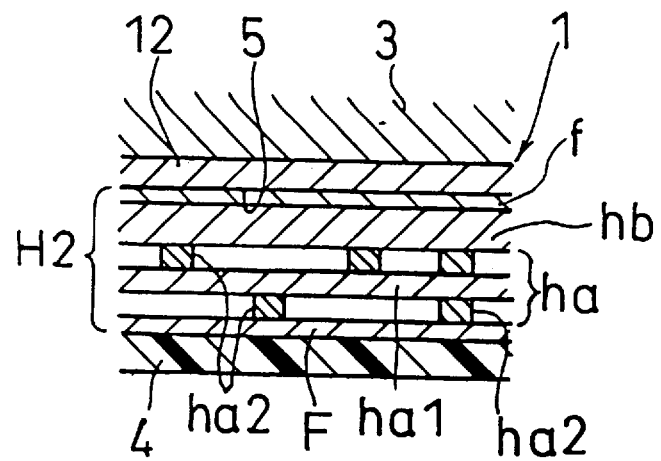
FIG. 7 is a partially enlarged and sectional view showing the just before the state where, in the second embodiment where an insulation resin layer is laminated on one surface of a circuit substrate, the material is pressurized against the smooth surface by the film body.

The material H2 comprises, in this embodiment, as shown in FIG. 7, the circuit substrate formed with a circuit pattern ha2 on the insulation layer ha1 and the resin layer hb having insulation property laminated on at least one surface of the circuit substrate ha.

The circuit substrate ha is formed on both surfaces of the insulation layer ha1 with a given circuit pattern ha2. The insulation layer ha1 comprises of a thermosetting resin such as epoxy resin, phenol resin and polyimid derivatives and the circuit pattern ha 2 is formed by being laminate-molded as one layer with heating and being pressurized to be hardened in the state where the thermo-setting resin to become this insulation layer ha1 and a copper foil C (FIG.9 in double dotted line) to become electrically conductive are overlapped, and thereafter by etching so on.

Further, the resin layer hb having insulation property comprises of a thermosetting resin as well as in the insulation layer ha1 of the circuit substrate ha, and is formed as a sheet-like having approximately same dimension of the insulation layer ha1. On the surface opposite to the side of the resin layer hb having insulation property, where the circuit subtrate ha is laminated, a resin film layer f is adhered. This resin film layer f functions as a releasing film to prevent the resin layer hb having the insulation property, which is pushed to the smooth surface 5 in the molten state, from being stuck to the smooth surface 5, and also functions as a protective film to prevent the resin layer hb having the insulation property and waiting the next process such as lamination process of another resin layer having the insulation property from being stuck with dusts by sticking just before the next process.

Further, between the side of the circuit substrate ha on which the resin layer having the insulation property is no laminated and the film body 4, the releasing film F is interposed. The releasing film F is formed in such dimention as it can cover the edge of the resin layer hb having the insulation property, functions as a releasing member by interposing between the edge of the resin layer hb having the insulation property and the film body 4 and prevents the molten resin of the resin layer hb having the insulation property from being adhered to the film body 4 and contaminating the film body 4.

For reference, the resin layer hb having the insulation property and the resin film layer f may be, other than the sheet-like having approximately same dimension to the insulation layer ha 1 of the circuit substrate ha, what is formed in such a manner as it is formed as continuous band-like spreading right and left as illustrated in the frame 6 in FIG. 6. Further, the resin layer hb having the insulation property may be, after laminating the circuit substrate, further laminated with a copper foil C etc. or adhered with the copper foil C etc.

As the melting means 3, in this embopdiment, since the resin layer hb having the insulating property consists of the thermosetting resin, the sheet-like electric heater (hereinafter, the melting means is referred to as "electric heater 3") able to control temperature to melt appropriately the resin layer hb having the insulation property and be hardened further due to a chemical reaction. The lower side of the electric heater 3 is provided with a base 12 having the rigidity and the lower side of the base 12 forms the smooth pressurizing surface 5 of the upper platen 1.

When using the thus constituted lamination molding apparatus, as shown in FIG. 7, by overlapping the circuit substrate ha and the resin layer hb having the insulation property the material H2 is placed on the film body 4 opposing to the smooth surface 5 in such a manner as the circuit pattern ha 2 of the circuit substrate contacts to the film body 4.

Next, the second embodiment of the lamination molding method of the present invention is in detail explained according to the case where, using the lamination molding apparatus constituted as mentioned above and mainly based on FIG. 7–9, the circuit substrate is laminate-molded. The lamination molding method of the pesent invention comprises the steps of, in general, overlapping the circuit substrate ha and the resin layer hb having the insulation property, disposing these between the smooth surface 5 having rigidity and the film body 4 having the flexibility provided so as to be able to pressurize these to the smooth surface 5 in such a manner as the resin layer hb having the insulation property contacts to the smooth surface 5 when it is pressurized by the film body 4 and the circuit pattern ha 2 of the circuit substrate ha contacts to the film body 4, depressurizing between the circuit substrate ha and the resin layer hb having the insulation property and therearound without pressurizing these, melting the resin layer hb having the insulation property while keeping the above depressurizing and pressurizing the material H2 to the smooth surface 5 by the pushing of the film body 4.

At the time when laminating the material H2 consisting of the circuit substrate ha and the resin layer hb having the insulation property, as shown in FIG. 7, initially, the releasing film F is placed on the film body 4 opposing to the smooth surface 5, the circuit substrate ha and the resin layer hb having the insulation property are made to be overlapped, and the material H2 is placed on the approximately center of the releasing film F in such a manner as the circuit pattern hb of the circuit substrate ha is disposed on the film body 4 (that is, like contacting to the film body 4).

And, by displacing the lower platen 2 to come close to the upper platen 1, the frame 6 is made to be clamped between the opposing surfaces of the upper platen 1 and the lower platen 2 to form the laminate-molding space K being accommodated with the material H2. This laminate-molding space K is sealed air-tightly by the sealing member 15 abutting to the frame 6. Further, the recessed portion 20 of the lower platen 2 is adapted to become a space having the air-tightness by the film body 4 abutting to the seal member 25.

Next, by driving the depressurizing means of the contact pressurizing means 9 the air in the recessed portion 20 is sucked through the path, the film body 4 is made to contact to the surface of the air-penetrating member 23 (the opposing surface of the lower platen 2). Then, since the air between the air-penetrating member 23 and the film body 4 is sucked through the holes 22a and 3a formed on the approximately center of the heat insulating member 22 and the electric heater 3 respectively, the plurality of lattice-like grooves 22b formed on the heat insulating member 22 and the gap between the circumferential sides of the heat insulating member 22 and the electric heater 3 and the side wall of the recessed portion 20, the film body 4 is adapted to contact even to allover the surface of the air penetrating member 23.

In this state, by operating the depressurizing means not shown of the suction means 7 the laminate-folding space K is depressurized to less than 1 atmosphere from the path 26 formed so as to be opened to the inner circumferential edge of the frame 6 through the exhaustion path 27. Since the film body 4 contacts air-tightly to the air penetrating member 23, by depressurizing the laminate-molding space K, the film body 4 is not swollen unintentionally, so that the resin layer having the insulation property and the circuit substrate are not pressurized during depressurizing, While keeping the depressurizing in the lamiate-molding space K, by the electric heater 3 or due to the temperature controlled fluid such as vapor having a given temperature being passed through the temperature controlled fluid channels 18, 28, the resin layer hb is heated till a given temperature at which the resin layer hb is molten.

Thereafter, the contact pressurizing means 9 is changed from the suction by the depressurizing means to the supply of the compressed air by the compressed air supplier such as an air compressor. The compressed air of the compressed air supplier is supplied in the recessed portion 20 under a given pressure through the path 21. Since the compressed air supplied through the path 21 into the recessed portion 20 flows through the holes 22a, 3a formed at approximately center of the heat insulating member 22 and the electric heater 3 respectively, and the plurality of grooves 22b formed lattice-like on the heat insulating member 22, and the gap formed between the circumferential sides of the heat insulating member 22 and the electric heater 3 and the side wall of the recessed portion 20, its operating function effects even on allover the film body 4, so that the film body 4 is adapted to be swollen even.

Figure 8:
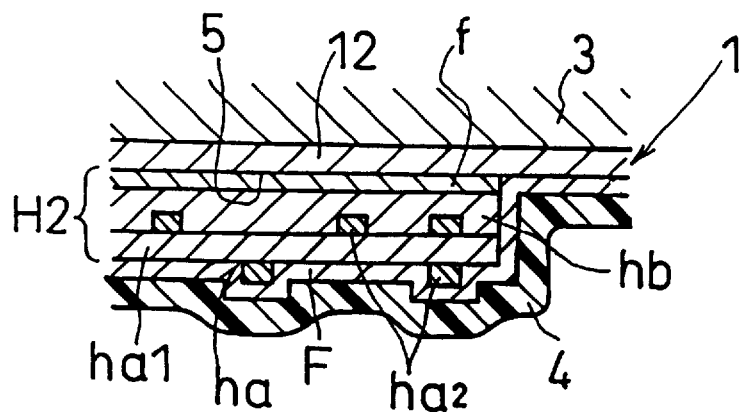
FIG. 8 is a partially enlarged and sectional view showing the state where, from the state of FIG. 7, the circuit pattern of the reverse side of the circuit substrate is embedded in the insulation resin layer to become in a unit by pressurizing the film body in the state it is deformed in accordance with the circuit pattern of the circuit substrate.
Figure 20:
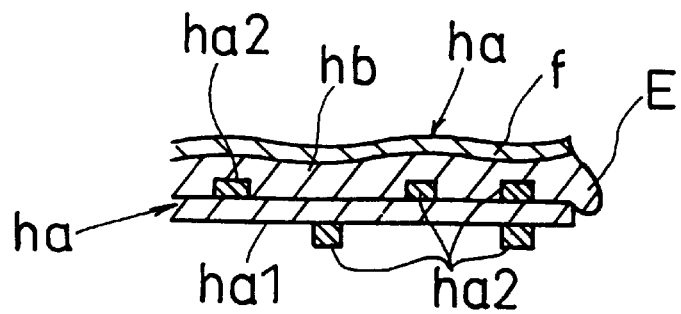
FIG. 20 is a partially enlarged view showing the state where the material is pressurized from the state of FIG. 19 and the circuit substrate is deformed.

When the film body 4 is made swollen in the state where the resin layer hb having the insulation property, the material H2 is pressurized by being pushed to the smooth surface 5 of the upper platen 1 by the film body 4. By the effect that the circuit pattern ha 1 of the circuit substrate ha is pushed to the resin of the molten resin layer hb having the insulation property, the resin of the molten resin layer hb having the insulation property flows around the circuit pattern ha 2 as being pushed out, so that, as shown in FIG. 8, the circuit substrate ha is united completely with the resin layer hb having the insulation property. And, when the material H2 is pressurized, since it is already depressurized less than 1 atmosphere in the laminate-molding space K i.e. between the resin layer hb having the insulation property and the circuit substrate ha and around these, there is no anxiety of generating voids in the laminated circuit substrate. Further, since the film body 4 is pressurize through the releasing film F in the state where the film body 4 is deformed in accordance with the concavo-convex shapes of the circuit pattern ha 2, there is no deformation of the circuit substrate ha (see in contrast with FIG. 8 and 20). Further, since the molten resin layer hb having the insulation property is pushed to the smooth surface 5, the surface of the resin layer ha having the insulation property is adapted to be molded smooth.

In addition to that, as shown in FIG. 8, since the film body 4 is pushed so as to cover allover the side of the circuit substrate ha through the releasing film F, the molten resin layer hb having the insulation property is not be leaked out from the side edge, therefore, there is no occurrence where the thickness of the insulating layer ha 1 of the laminated circuit substrate becomes thinner than the one settled and the dimension of the width and the longitudinal length of the circuit substrate becomes larger than the ones settled, so that, what is led to the deterioration of the dimension precision of the circuit substrate hb. And, the resin of the molten resin layer hb having the insulation property is prevented from being stuck to the film body 4 and contaminating it.

When the circuit substrate ha becomes completely united with the resin layer hb having the insulation property, the electric heater 3 is controlled in such a manner as the resin layer hb having the insulation property as a thermosetting resin is hardened due to a chemical reaction. When the resin layer hb having the insulation property is hadened, the lamination molding is finished.

When the lamination is finished, as an example, by flowing the cooling water through at least one of the temperature controlled fluid channels 18, 28 of the upper platen 1 and the lower platen 2, the laminated product is cooled. And, the depressurizing means not shown of the suction means 7 is stopped and in order to release the laminate-molding space K from the depressurized atmosphere an air is supplied to the laminate-molding space K through the exhausting path 27 from the path 26. Further, by releasing the compressed air being supplied in the recessed portion 20 and returning it in the atmosphere, or by sucking the air in the recessed portion 20 by again operating the depressurizing means of the contact pressurizing means 9 the film body 4 is made to contact to the surface of the air-penetrating member 23. Then, by separating the platen 2 from the platen 1, the laminate-molding space K is made to be released and the product is taken out. In this embodiment, by flowing the cooling water through the temperature controlled fluid channels 18, 28 to cool the product, it is possible to shorten the laminate-molding cycle and, in the case where the resin layer hb having the insulation property and being adhered with the copper foil and so on is used, the copper foil and such is cooled even while avoiding some wrinkles from generating.

Figure 9:
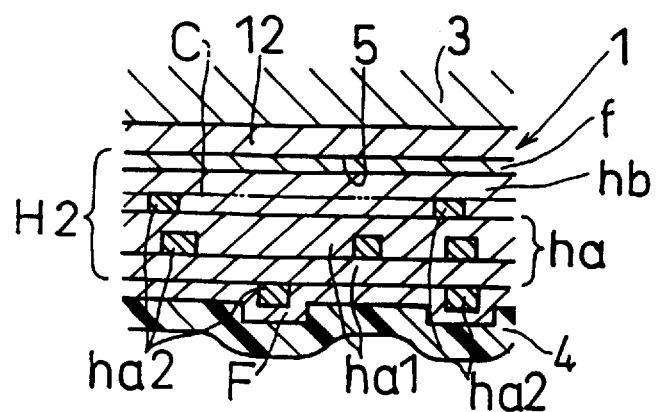
FIG. 9 is an partially enlarged view showing the state where, in order to form the circuit pattern in multiple from the state of FIG. 8, further insulation resin layers are laminate-molded.

In this embodiment, as shown in a chain line in FIG. 9, an electric conductive layer such as copper foil C is laminated on the surface of the insulating layer ha 1 (the resin layer hb having the insulation property prior to lamination) laminated completely in a unit on the circuit substrate, on the surface of that electric conductive layer C, a photo-resist forming layer is laminated, by etching etc a new circuit pattern ha 2 is formed and in order to form further circuit pattern ha 2 on the multiplied lamination, by repeating the above lamination molding method further resin layers hb having the insulation property are laminated.

Next, the third embodiment of the lamination molding method and apparatus of the present invention is explained in accordance with the case where the circuit substrate is used for laminate-molding the circuit substrate based on FIGS. 6, 10–13. For reference, in this embodiment, the same and corresponding signs to the same and corresponding parts are used with same signs and explanations thereof are omitted.

The lamination molding apparatus of this embodiment of the present invention, in general, in which the material H2' comprises the circuit substrate ha formed with the circuit pattern ha 2 on the surface of the insulating layer ha 1 and the resin layers hb, hb having at least the insulation property which are laminated on both sides of the circuit substrate ha, is for making the surfaces of the resin layers hb, hb having the insulation property smooth, and that apparatus comprises the upper platen 1 and the lower platen 2 which are provided in opposing manner to come close to and separate from each other, the melting means 3 for melting the resin layers hb, hb, the film body 4 having the flexibility and being provided to be able to push either one of the resin layer hb, hb having the insulation property of the material H2', the smooth surface 5 formed in such a manner as another resin layer hb, hb of the material H2' having the insulation property is pushed to another surface of the opposing surfaces of the upper platen 1 and the lower platen 2, the pressurizing-plate 8 deformable resiliently interposed between one of the resin layer hb, hb of the material H2' having the insulation property and the film body 4, the frame 6 to form the laminate-molding space K sealed to accommodate the material H2' by being clamped with the opposing surfaces of the upper platen 1 and the lower platen 2, the depressurizing means 7 to depressurize the formed laminate-molding space K sealed, the contact pressurizing means to contact the film body 4 arbitrarily to either one of the opposing surfaces provided on the upper platen 1 and the lower platen 2 on which the film body 4 is provided and separate from either one of the opposing surfaces provided on the upper platen 1 and the lower platen 2 on which the film body 4 is provided and pressurize through the pressurizing-plate 8 the material H2' between film body 4 and the smooth surface 5 formed on another one of opposing surfaces provided on the upper platen 1 and the lower platen 2. And, the dimension of the pressurizing-plate 8 is made approximately identical with one of the material H2'.

That is, in this embodiment, the material H2' is the type which is laminated with the resin layer hb, hb on its both sides of the circuit substrate ha and in this point different from the above embodiment which is laminated with the resin layer hb on one side of the circuit substrate ha. And, in this embodiment, the pressurizing-plate 8 is added to the above embodiment.

For reference, the resin layer hb, hb having the insulation property are respectively identical with the one of the above embodiment, and on the circuit substrate ha and the surface opposite to the surface on which the lamination is laminated the resin film layer f is adhered.

The pressurizing-plate 8, in this embodiment, is made from a stainless plate having the thickness of 1–2 mm and is formed with the dimensions (largeness) of the length and width same to the ones of the material H2'. The resiliency when it is deformed can be controlled by the thickness etc. thereof.

Figure 10:
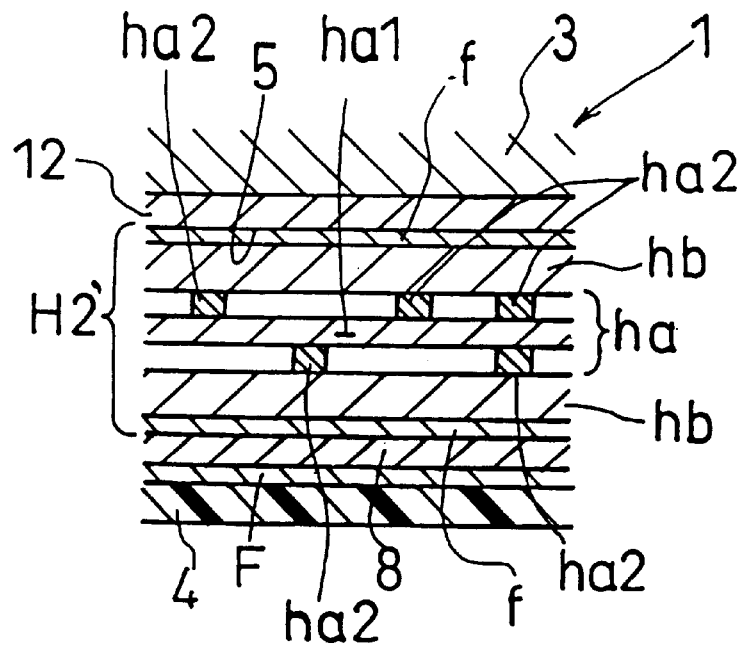
FIG. 10 is a partially enlarged and sectional view showing the just before state where, in the third embodiment to laminate the insulation resin layer on both sides of the circuit substrate, the material is pressurized by the film body to the smooth surface.

In the embodiment illustrated in FIG. 10, the pressurizing-plate 8 is placed on the film body 4 through the releasing film F as a mold-releasing member. The releasing film F is formed larger than the width and length of the material H2' in order to cover the edge thereof. And, in this embodiment, the circuit substrate ha is overlapped in such a manner as it is clamped with the resin layer hb, hb having the insulation property and placed (overlapped) on the pressurizing-plate 8 placed on the film body 4. When being pressurized by the film body 4, the resin film layer f adhered to the resin layer hb, hb having the insulation property is adapted to contact to the pressurizing-plate 8 placed on the the smooth surface 5 of the upper platen 1 and the film body 4.

Next, the third embodiment of the lamination molding method of the present invention, in accordance with the case where the lamination molding apparatus constituted as above mentioned is used, based on mainly FIGS. 10–13 is explained. The lamination molding method is for forming the surface of the resin layer hb, hb smooth in which the material H2' consists of the circuit substrate ha which is made from the insulating layer ha 1 the surface of which is formed with the circuit pattern ha 2 and the resin layer hb, hb at least having the insulation property which is laminated on both sides of the circuit substrate ha, and, in general, comprises the steps of interposing the circuit substrate ha between the resin layers hb, hb having the insulation property, overlapping the material H2' in the state where the circuit substrate ha is interposed between the resin layers hb,hb having the insulating property and the pressurizing plate 8 resiliently deformable, disposing the pressurizing plate 8, while the material H2' and the pressurizing plate 8 are pressurized by the film body 4 between the smooth surface 5 having rigidity and the film body 4 having the flexibility and being provided for enabling to be pressurized to the smooth surface 5, in such a manner as it is interposed between the material H2' and the film body 4, depressurizing between these and therearound without pressurizing the circuit substrate ha and the resin layers hb, hb having the insulation property, melting the resin layers hb, hb having the insulation property while keeping the depressurization and pressurizing the material H2' by pushing it to the smooth surface 5 by the film body 4 through the pressurizing plate 8.

When laminating the material H2' consisting of the circuit substrate ha and the resin layers hb, hb having the insulation property, as shown in FIG. 10, initially, the releasing film F is placed on the film body 4, at approximately central portion of the releasing film F, the material H2' in the state where the circuit substrate ha is interposed between the pressurizing plate 8 and the resin layers hb, hb are placed in being overlapped. For reference, the resin layers hb, hb having the insulation property, when the circuit pattern ha 2 of the circuit substrate ha contacts to the film body 4 and is pressurized by the film body 4, is disposed in such a manner as the adhered resin film layer f, f contacts to the smooth surface 5 and the pressurizing plate 8. As to the processes after the processes where the laminate-molding space K for accommodating the material H2' is formed, these are similar with the ones of the above embodiment.

Figure 11:
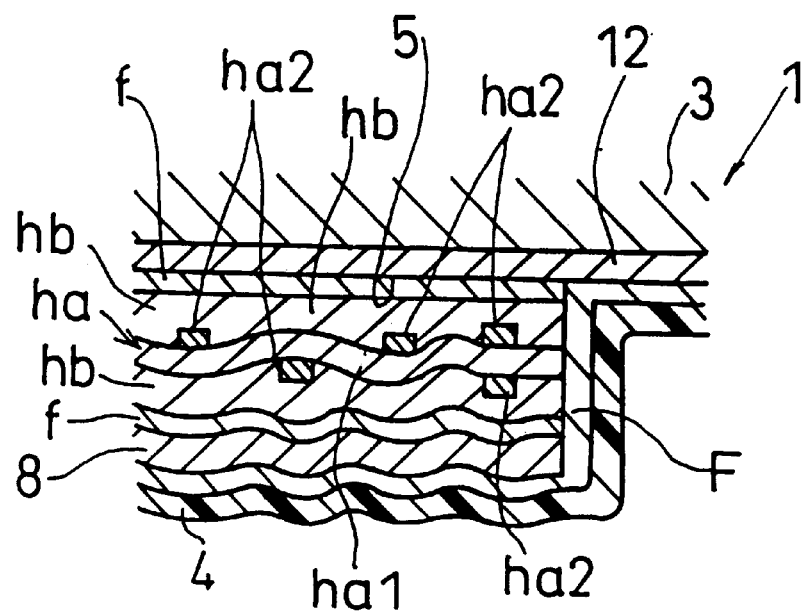
FIG. 11 is a partially enlarged view showing the initial state where the material is pressurized to the smooth surface through the pressurizing-plate from the state of FIG. 10 and the circuit substrate and the pressurizing-plate are deformed while the circuit pattern is not instantly embedded due to the flowing resistance of the molten insulation resin layer.
Figure 12:
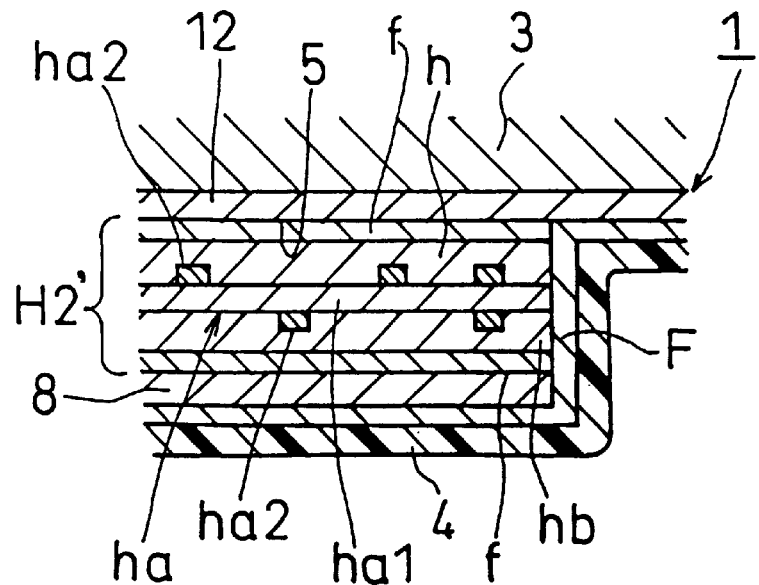
FIG. 12 is a partially enlarged and sectional view showing the state where, from the state of FIG. 11, the pressurizing-plate is restored resiliently to the original plain plate, the circuit pattern is pressurized between the smooth surface of the pressurizing-plate and the film body through the pressurizing-plate and pushed in the insulation resin layer, the molten insulation resin layer flows around the circuit pattern as being pushed out and the surface of the insulation resin layer is molded smooth.

When the film body 4 is swollen in the state where the resin layers hb, hb having the insulation property are molten by the electric heaters 3, 3 and the material H2' is pushed and pressurized by the film body 4 through the pressurizing plate 8 to the smooth surface 5 of the upper platen 1, initially, the circuit pattern ha 2 of the circuit substrate ha is not instantly embedded as shown FIG. 11, the circuit substrate ha is deformed in such a manner as the exposed portion of the insulating layer ha 1 between the circuit pattern ha 2 contacts to the resin layers hb, hb having the insulation property and thereby the pressurizing plate 8 also is deformed within the limit of resiliency. Then, the circuit pattern ha 2 is pushed in the resin layers hb, hb having the insulation property is flown as being leaked out around the circuit pattern ha 2. As a result, the circuit substrate is completely united with the resin layer having the insulation property. And, by the further flow of the molten resin layers hb, hb having the insulation property and the resilient restoring of the pressurizing-plate 8 to the original plain plate-like, since the material H2' is pressurized by the film body 4 between the pressurizing-plate 8 and the smooth surface 5 of the upper platen 1, as shown in FIG. 12, both surfaces of the laminated product, that is, the surface of the resin layers hb, hb having the insulation property respectively is adapted to be molded smooth.

In addition, since the releasing film is formed larger in dimension than the material H2' and the film body 4 pushes the overall side of the circuit substrate through the releasing film, the resin of the molten resin layer having the insulation property is not leaked out from the side edge, there is no deterioration in the dimension precision in such a manner as the thickness of the insulating layer of the laminated circuit substrate becomes thinner than the designed one and the width and length of the circuit substrate become larger than the designed ones. Further, there is no anxiety of adhesion and contamination by the molten resin of the resin layer hb having the insulation property to the film body 4.

Figure 13:
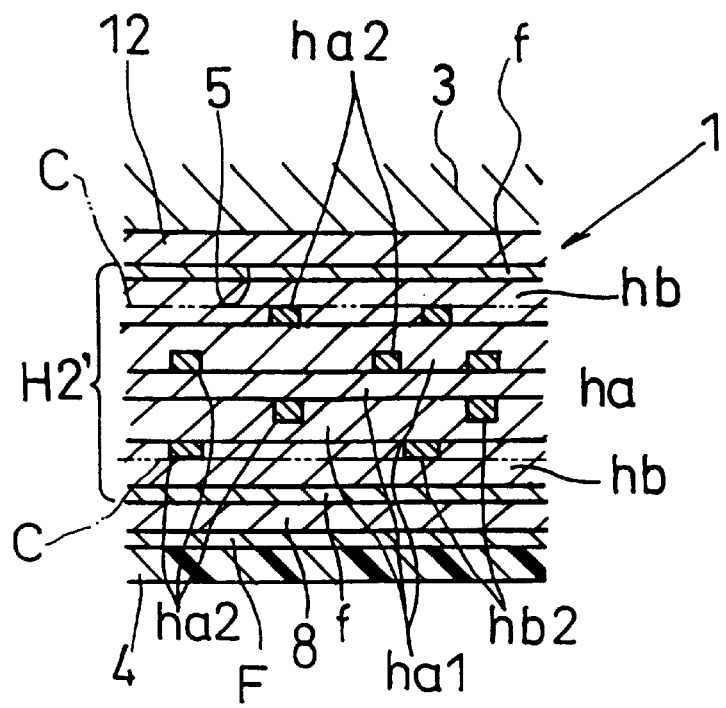
FIG. 13 is partially enlarged view showing the state where, in order to form further multiple circuit patterns, further the insulation resin layer is laminated.

In this embodiment, as shown in FIG. 13, by the lamination of the electric conductive layer C such as copper foil to the surface of the insulation layer ha 1 (the resin layers hb, hb having the insulation property prior to lamination) laminated to the circuit substrate completely in a unit, on the surface of this electric conductive layer C the photo-resist forming layer is laminated, and to form a further and new circuit pattern ha 2 by such as etching, the above lamination molding method is repeated, as a result, the resin layer hb having insulation property is further laminate-molded.

Next, the fourth embodiment of the lamination molding apparatus of the present invention is explained in detail based on FIGS. 14–18. In this embodiment, although the explanation is done in accordance with the case where as well as in the first embodiment shown in FIGS. 1–5, the lamination member to be laminated of the material H1 has the anxiety of the brittle destruction and is itself the IC chip or the coil h1 which has convex shapes and the molded product in which the IC chip h1 in its surface and such is embedded in order to become smooth is the IC card, the signs which are same and corresponding to the parts which exist in the previous embodiment are applied in this embodiment too and the explanation thereof is omitted. The different points of this embodiment from the first embodiment resides in that a pair of smooth pressurizing surfaces consist of two pressurizing plates 8, 8 and both are pressurized by the film body 4, 4 which are provided on the opposing surfaces of the upper platen 1 and the lower platen 2. And, in this embodiment, the pressurizing force due to the film body 4, 4 is adapted to be possible.

Figure 14:
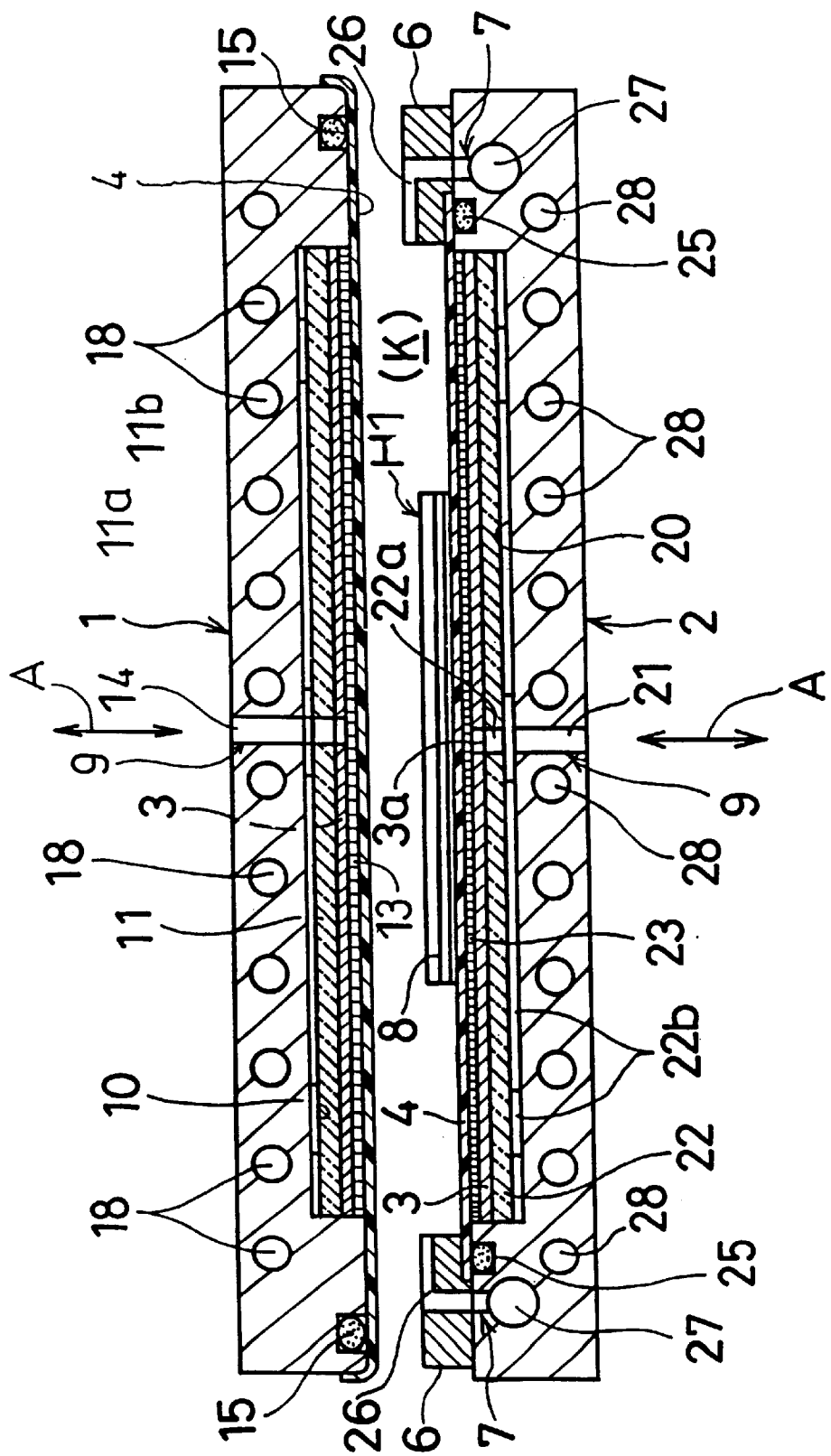
FIG. 14 is a sectional view showing the fourth embodiment of the lamination molding apparatus of the present invention.

The lamination molding apparatus, as shown in FIG. 14, comprises, in general, the upper platen 1 and the lower platen 2 provided relatively to come close to and separate from each other in opposing manner, the melting means 3 to melt the resin layer h2, the film body 4, 4 provided an the opposing surfaces of the upper platen 1 and the lower platen 2 respectively, the frame 6 forming a sealed molding space K to accommodate the material H1 by being clamped between the upper platen I and the lower platen 2, the suction means 7 to depressurize the formed molding space K, the pressurizing plate 8, 8 as a pressurizing surface resiliently deformable which are interposed between the surface of the film body 4 and the material H1 respectively, the contact pressurizing means 9 which make arbitrarily film body 4 to contact to the opposing surfaces of the upper platen I and the lower platen 2 and separate from the opposing surfaces of the upper platen and the lower platen, and pressurize the material H1 between the pressurizing plate 8, and a stabilizing means to stabilize the molten resin layer. And, the dimension of the pressurizing plate 8 is adapted to be formed approximately same to the molded product, and the dimension of the material H1 is adapted to be formed a little smaller than the one of the pressurizing plate 8.

The material H1 in this embodiment is in advance printed with parallel rows of patterns indicating such organization body's name to which that card belongs, any information and design etc. on its surface i.e. the surface of the resin layer h2, h2 of the molded product i.e. IC card.

The upper platen 1 in this embodiment as well as in the first embodiment is pierced at the approximately center thereof with a path 14 as a part forming the contact pressurizing means 9 in such a manner as it is in communication with the recessed portion 10, and within that recessed portion 10 a heat insulating means 11, the electric heater 3 and the air penetrating member 13 are accommodated, and on the lower surface thereof the edge of the film body 4 is mounted in such a manner as it covers all. And, between the circumferential sides of the electric heater 3 and the side wall of the recessed portion 10, a gap (not shown) is formed, at approximately center of the heat insulating member 11 and the electric heater 3 holes 11a and 3a are formed respectively which are in communication with the path 14, on the surface of the heat insulating member 11 contacting to the upper surface of the recessed portion 10 a plurality of grooves 11b are formed in lattice-like in such a manner those are opened to the side of the heat insulating member 11 and in communication with the path 14.

Figure 15:
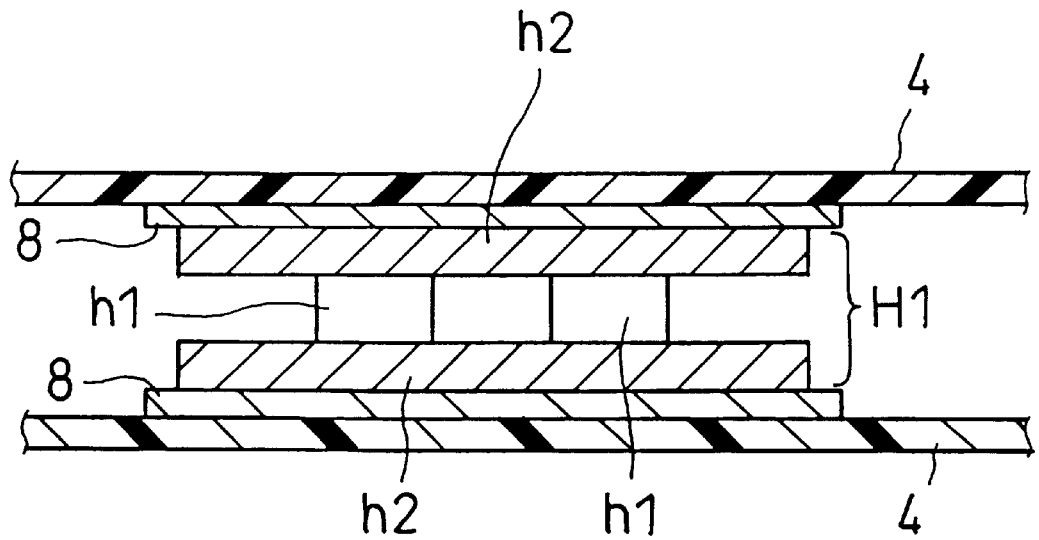
FIG. 15 is an enlarged and partially sectional view showing the disposition of the material and the state where an initial clamping process is carried out.
Figure 16:
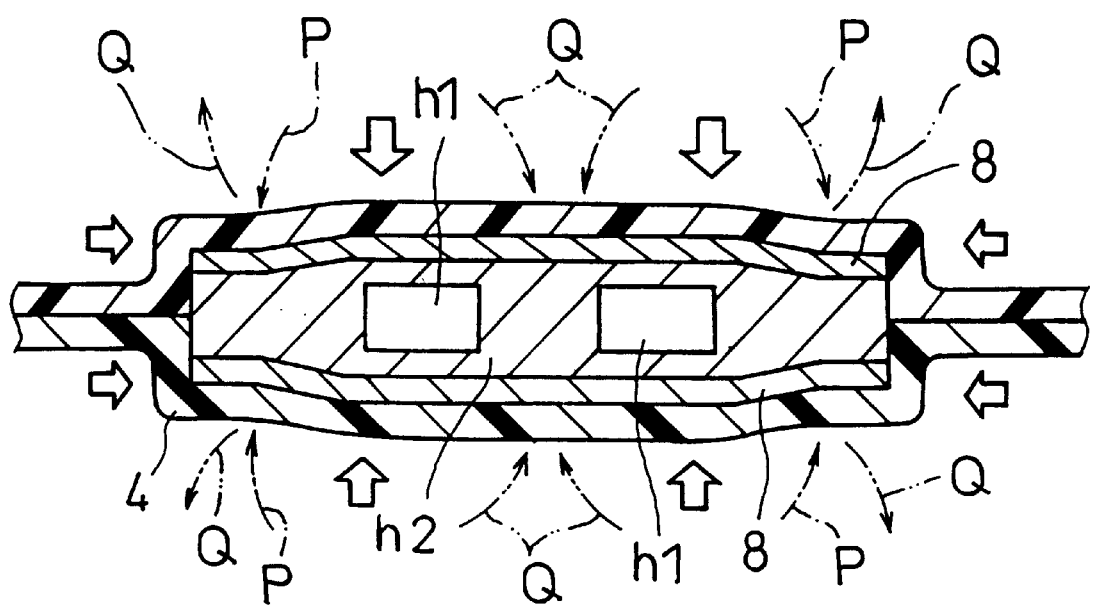
FIG. 16 is a partially enlarged view showing the state where, at the time of initially carrying out the initial clamping process and the main clamping process, the pressurizing-plate is resiliently deformed in accordance with the convex shapes.

In this embodiment, the pressurizing plate 8, as shown in FIG. 15, is placed on the film body 4. And, on that pressurizing plate 8 IC chip etc. is placed in such a manner as it is clamped with the resin layer h2, and on the upper side of the resin layers h2 the pressurizing plate 8 is placed. For reference, between the pressurizing plate 8 and the resin layer h2, as well as in the embodiment shown in FIG. 5, a releasing film F may be interposed. In this case, the pressurizing plate 8 functions as preventing the molded product which is the original product of the releasing film. P from being adhered to the pressurizing plate 8 other than as preventing it from off-setting of the printing on the surface of the resin layer to be described later. However, it is one condition that the melting point of the releasing film F is higher than the one of the resin layer. Thus, mentioning the "pressurizing surface" in the present invention, if it is possible to obtain a given resilience, as a material of the pressurizing-plate 8, not only the above stainless plate but also which is obtained by combining the metal plate such as stainless steel with the resin such as polyethylene terephthalate or by the resin itself may be formed, further, it includes the releasing film F which is interposed between the pressurizing plate 8 and the surface of the resin layer h2 to be molten.

The contact pressurizing means 9 is formed in such a manner as it is connected to the paths 14, 21 which are opened to the recessed portions 10, 20 in such a manner a depressurizing means such as vacuum pump, for instance, and a compressed air supplying source (not shown) are arbitrarily and exchangeably connected thereto. The upper platen 1 in this embodiment as well as the lower platen 2, as shown in arrow A in FIG. 14, is adapted to be formed for sucking the air of the recessed portion 10 through the path 14 and further supplying the air therein. When the air being sucked or supplied through the path 14, as mentioned above, which effects even on the overall the film body 4 since the air flows through the air penetrating member 13, the holes 11a, 3a provided on the approximately central portions of the heat insulating member 11 and the electric heater 3, the plurality of grooves 11b provided on the heat insulating member 11 and the gap formed between the circumferential sides of the heat insulating member 11 and the electric heater 3 and the side wall of the recessed portion 10.

In this embodiment, the contact pressurizing means 9 is controlled exchangeably by a controlling means (not shown) in its air supplying pressure of the compressed air supplying source at an initial clamping process and a main clamping process. The resin layer h2, in general, shrinks by being molten by the electric heater 3. However, in the present invention, at the initial clamping process, since the air within the range of the pressure which is lower than the main clamping pressure and higher than the atmosphere is supplied in the recessed portion 10 and 20, and the overall surface of the material H1 through the film body 4 and the pressurizing-plate 8 is even pressurized, the shrinkage of the resin layer h2 is prevented to obtain the molded product having the smooth surface indicated clearly with the printed pattern applied in advance. For reference, here the statement at the initial clamping process the statement "to pressurize the material with the pressure preventing the shrinkage due to melting of the resin layer" means that the case where the shrinkage is prevented by the weight of the pressurizing plate or the pressurizing plate and the material includes the case where the pressurizing is not carried out by the film body 4, 4.

On the other hand, in the main clamping process, the air having the pressure under which the surface of the molded product can be molded while embedding the IC chip and so on in the molten resin layer h2 is supplied in the recessed portions 10 and 20, the overall surface of the resin layer h2 of the material H1 is pressurized even through the film body 4 and the pressurizing plate 8.

Next, the fourth embodiment of the lamination molding method of the present invention is explained in detail in accordance with the case where, using the lamination molding apparatus of the above embodiment, the material H1 such as IC chip and so on is embedded in the resin layer h2.

The lamination molding method of the present invention, in which the material H1 has the IC chip etc h1 and the resin layer h2 having the possibility of the brittle desctruction is for laminate-molding the IC chip h1 etc while embedding the IC chip h1 in the resin h2 to make the surface of the product smooth, and comprises the steps of disposing the pressurizing plate 8, 8 resiliently deformable between the the resin layer h2 of the material H1 and the film body 4, 4 in such a manner as the former is interposed between the resin layer h2 and the film body 4, 4, depressurizing between the resin layer h2 and IC chip etc h1 and thereabout to less than 1 atmosphere without pressurizing the resin layer h2 and the IC chip h1 and so on, melting the resin layer h2 while keeping the depressurizing, carrying out the initial clamping process for pressurizing the material H1 under the pressure which can prevent the molten resin layer h2 from being shrunk, then, carrying out the main clamping process for pressurizing the material H1 under the pressure which can mold the surface of the molded product smooth while embedding the IC chip h1 etc. in the resin layer h2. And, on the surface of the resin layer of the material a plurality of patterns of printings for the plural sheet of IC cards are applied, after stabilizing of the resin layer of the material, every printing pattern is, by cutting, divided in a plurality of printing pattern.

When molding the product, initially, the pressurizing-plate 8 having the dimension a little larger than the material H1 and approximately same to the molded product, the material H1 formed by overlapping the resin layer h2, the IC chip h1 etc. and the resin layer h2 and the pressurizing plate 8 are overlapped from the below in turn and placed on the film body 4 (see FIG. 15).

And, by making the lower platen 2 to come close to the upper platen 1 and the frame 6 be clamped between the opposing surfaces of the upper platen 1 and the lower platen 2 to form the molding space K for accommodating the material H1. This molding space K is sealed air-tightly by the seal member 15 which abuts to the frame 6 through the film body 4 of the upper platen 1. And, the recessed portion 20 of the lower platen 2 becomes a space which is sealed air-tightly by the film body 4 which abuts to the seal member 25.

Then by separating the depressurizing means of the contact pressurizing means 9, the air of the recessed portion 10, 20 through the path 14, 21, the film body 4 is made to contact to the surface of the air penetrating member 13, 23.

Then, since the air between the air penetrating member 13, 23 and the film body 4 is sucked through the holes 11$a$, 3$a$ and 22$a$, 3$a$ formed at the approximately center of the electric heater 3 and the heat insulating member 22, and the heat insulating member 22 and the electric heater 3 respectively the plurality of lattice-like grooves 11$b$, 22$b$ formed on the heat insulating member 11, 22 and the gap formed between the circumferential sides of the heat insulating members 11, 22 and the electric heaters 3, 3, and the side walls of the recessed portions 10, 20, the allover film bodies 4, 4 are adapted to be contacted even to surface of the air-penetrating members 13, 23.

In this state, by operating the depressurizing means (not shown) of the suction means 7, the molding space K is depressurized to less than 1 atmosphere through the exhausting path 27 from the path 26 formed to open to the inner edge of the frame 6. Since the film body 4 is contacted air-tightly to the air-penetrating member 23, there is no anxiety that, by being swollen unintentionally due to the depressurizing the molding space K the resin layer h2 and the IC chip h1 etc. are pressurized. While keeping the depressurizing in the molding space K, by the electric heater 3 or the flow of the temperature controlled fluid such as vapor through the temperature controlled fluid channels 18, 28, the resin layer h2 is heated and melted.

Then, the contact pressurizing means 9 is changed from the sucking function by the depressurizing means to the function of supplying of the compressed air by the compressed air supply source, such as a not shown air-compressor, and so on. The compressed air of the compressor supply source is supplied to the recessed portions 10, 20 under a given pressure (explained in detail later) through the paths 14, 21 respectively. Since the compressed air supplied to the recessed portions 10, 20 flows through the paths 14, 21 through the holes 11$a$, 3$a$ and 22$a$, 3$a$ formed at approximately center of the heat insulating member 11, the electric heater 3 and the heat insulating member 22 and the electric heater 3 respectively, the lattice-like plurality of grooves 11$b$, 22$b$ formed on the heat insulating members 11, 22 and the gaps formed between the circumferential sides of heat insulating members 11, 22 and the electric heater 3, 3 and the side walls of the recessed portions 10, 20, the flowing effect functions even on the allover film bodies 4, 4, and by swelling the film bodies 4, 4 even, it is possible to pressurize even the overall surface of the resin layer h2 of the material H1, which is printed in advance.

Figure 17:
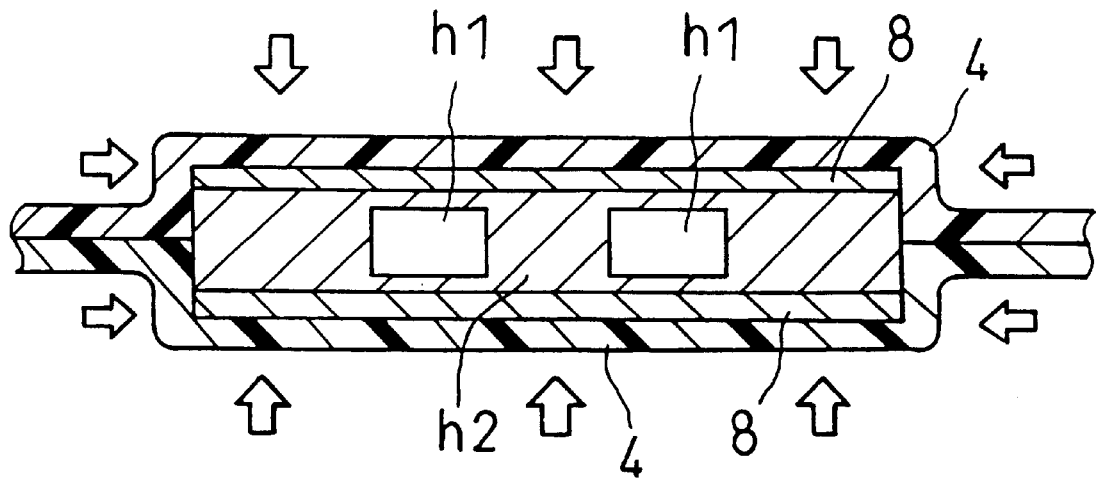
FIG. 17 is a partially enlarged and sectional view showing the state where the resin layer flows around the material due to the resilient restoring of the pressurizing-plate and surface of the material is molded smooth.

The pressure under which the air to be supplied to the recessed portions 10, 20, by the not shown control means, at the initial time when being pressurized to the material H1, is regulated and controlled (initial clamping process, the state of FIG. 15) for enabling the resin layer h2 to prevent from being shrunk due to the melting by the electric heater 3, then, it is regulated and controlled (main clamping process) for enabling the surface of the molded product smooth while embedding the IC chip h1 etc. in the resin layer h2 molten by the electric heater 3. At the initial time of this main clamping process, the IC chip h1 etc. itself is of convex-shape, and since the molten resin layer h2 has a viscosity, at the initial time of pressurizing by the film body 4, the IC chip h1 etc. is not embedded in the resin layer h2 due to the flowing resistance of the resin layer h2, and the resin layers h2, h2 which do not contact to the IC chip h1 etc. and exist around there while contacting with each other, and as shown by an arrow P in a chain line in FIG. 16, the pressurizing plate 8 is adapted to be deformed resiliently. And, when the state where the air having the pressure for the main clamping process in the recessed portion 10, 20 is supplied is kept, as shown by an arrow Q in double dotted chain line in FIG. 16, the pressurizing plate 8, 8 pressurized even by the film body 4 makes the resin layer h2 to flow due to the resilient restoring force, as shown in FIG. 17, the material H1 is pressurized by the film body 4 between the pressurizing plates 8, 8 which are restored plane-like, and both surfaces are molded smooth.

Figure 18:
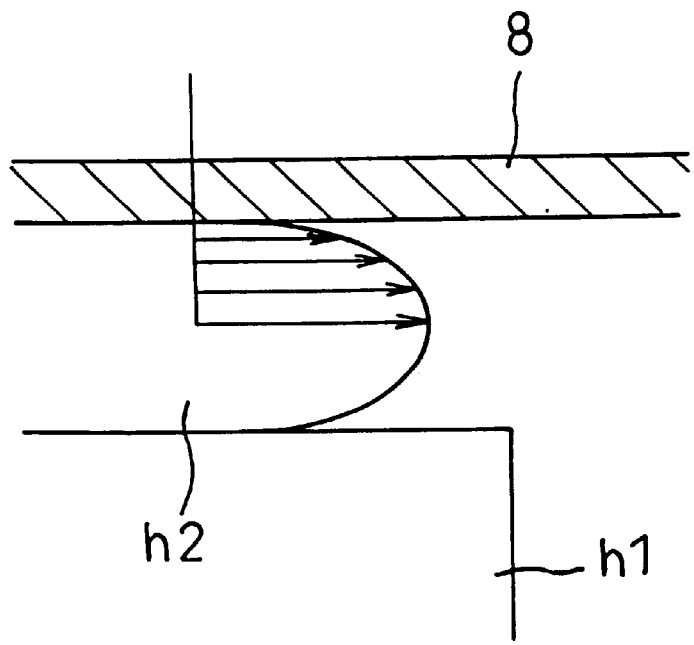
FIG. 18 is a schematic diagram for explaining the dimension of the flow of the flowing resin layer when the material is pressurized.
Figure 19:
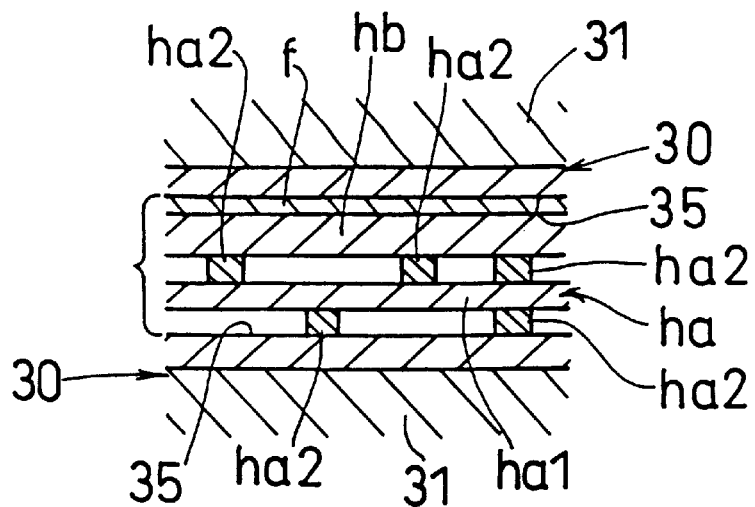
FIG. 19 is a partially enlarged view showing the case where the insulation resin layer is lamination molded to the circuit substrate by the conventional hot press.
Figure 21:
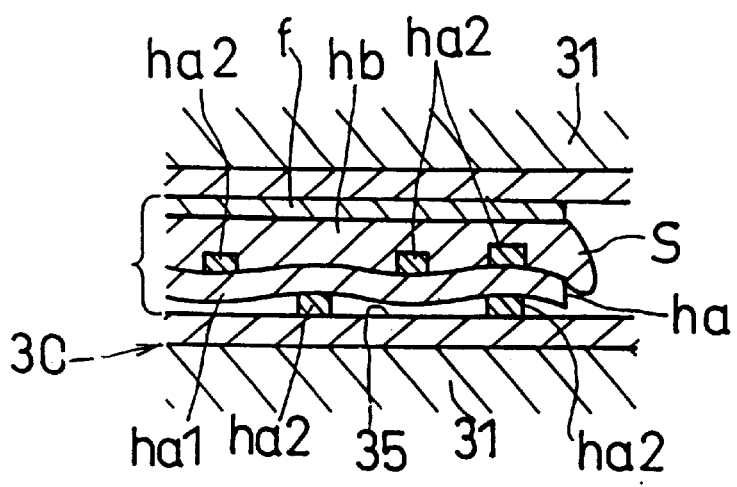
FIG. 21 is a partially enlarged view showing the molded product laminated by the conventional hot press.

When the material H1 formed a little smaller than the pressurizing plate 8 is molten and pressurized, and the resin layer is flown for the material H1 to become approximately same dimension to the pressurizing plate 8, as shown in FIG. 18, although, the flow of the resin layer is swift as far from the pressurizing plate 8 or the IC chip h1 etc., at the surface which contacts to the pressurizing plate 8 the flow of the resin layer is stopped. In the present invention, since, prior to the main clamping process, the initial clamping process is carried out and the pressurizing-plate 8 contacts to the surface of the resin layer, on that surface the printing pattern which is formed by being printed in a plurality rows in advance by the information such as a group name to which the IC card belongs and any design is clearly indicated without any displacing.

Further, since the film body 4 pressurizes the material H1 and the pressurizing plate 8 in such a manner as it covers the end faces thereof, and the resin of the molten resin layer h2 is pressurized, the resin of the molten resin layer h2 is not leaked out from the end faces thereof, and there is no deterioration in molding precision such like that the thickness of the product becomes thinner or the dimension in the width and length of the product becomes larger than the set ones. Further, at the time of pressurizing the material H1, since the molding space K, i.e. between the resin layer h2 and the IC chip h1 etc. and around there is already depressurized less than 1 atmosphere, there is no generation of voids in the molded product.

When finishing to mold, as an example, in the state where the cooling water is flown in at least one of the temperature controlled fluid channels 18, 28 the compressed air supplied to the recessed portion 10 or 20 is released to the atmosphere at a certain amount or again by operating the depressurizing means of the pressurizing means 9 and sucking the air in the recessed portion 10 or 20 the film body 4 is made to contact to the surface of the air-penetrating member 13 or 23, thereby it is carried out to cool the molded product. And by stopping the not shown depressurizing means of the sucking means 7 to release the molding space K from the depressurized state, the air is introduced in the molding space K from the path 26 through the exhausting path 27. Then, by displacing the lower platen 2 to separate from the upper platen 1 and to open the molding space K and take out the molded product. In this embodiment, by cooling the molded product by flowing the cooling water in the temperature controlled fluid channel 18 and/or 28, the laminate-molding cycle is shortened.

The molded product stabilized by being cooled is taken out from the molding space K, then cut at every printed pattern to give a sheet of IC card.

For reference, in this embodiment, although it was explained in accordance with the case where the pressurizing plate 8, 8 is constituted to pressurize the material H1 by operating the film body 4, 4 so as to be swollen by the compressed air supplied from the contact pressurizing means 9, the lamination molding method of the present invention is not limited to this. If it is what can mold smooth in the surface of the molded product by the processes of pressurizing the material H1 at a given pressure by the pressurizing plate 8, of being deformed resiliently of the pressurizing plate 8 at the initial pressurizing stage in accordance with the convex shapes of the material H1 and being restored resiliently of the pressurizing plate 8, it is a matter of course that the lamination molding as shown in the first embodiment can be used and the other means such as the autoclave using a pressurizing bag made of gum or the conventional hot press in which each hot plate is provided with a pressurizing plate 8 through a resilient member can be used. And, as long as it is what can be controlled for enabling to be changed between the initial clamping process to pressurize the pressurizing plate 8 to the material H1 under the pressure which can prevent the resin of the molten resin layer h2 from being shrunk and the main clamping process to pressurize the material H1 under the pressure which can laminate-mold while embedding the convex shapes of the material H1 in the resin layer h2 and can mold the surface of the molded product smooth, by using such an autoclave and a hot press the identical effect with above embodiment can be obtained. The effects according to each feature of the present invention are described as follows.

According to the first feature, a lamination molding method is provided by the following steps of disposing the material between a pair of pressurizing-surfaces, at least one of which can be deformed resiliently, depressurizing between these and therearound without pressurizing the resin layer and the material, melting the resin layer while keeping the depressurizing, laminate-molding the convex shapes of the material while embedding these in the resin layer to mold the surface of the molded product smooth by pressurizing the material under a given pressure by said pair of smooth pressurizing surfaces including, at the initial pressurizing process, the step of allowing at least one of the pressurizing surfaces to be deformed resiliently in accordance with the convex shapes, then at the main clamping process, and the step of molding the surface of the molded product smooth due to the resilient restoring to the plain state of the at least one of the pressurizing-surface to laminate-mold the surface of the molded product smooth while embedding the convex shapes of the material in the resin layer.

According to the second feature, a lamination molding method is provided by the following step of, in the first feature, laminate-molding the molded product, by the film body having flexibility through the pressurizing plate deformable resiliently constituting said one smooth pressurizing surface, by pushing and pressurizing the material to another pressurizing surface having rigidity while avoiding the resin layer to leak from the edge, thereby the molded product can be laminate-molded in precise manner.

According to the third feature, a lamination molding method is provided, in which, in the lamination molding method of the first and second features, by including the initial clamping process prior to the main clamping process to pressure the material under the pressure which can prevent the molten resin layer from being shrunk, in the state where the pattern such as information and design is printed in advance, without being out of the place of the pattern the molded product can be laminate-molded, so that the molding processes are simplified to obtain the molded product applied with clear printing.

According to the fourth feature of the present invention, a lamination molding method can be provided, which provides the steps of overlapping the resin layer and the material having convex shapes, between the smooth pressurizing surface having rigidity and the film body having flexibility and provided to be able to pressure it to the smooth surface disposing the convex shapes in such a manner as these get in touch with the film body at the time when these are pressurized by the film body, depressurizing therebetween and thereabout without pressurizing the resin layer and the material, melting the resin layer while keeping the depressurizing and pushing and pressurizing the resin layer and the material to the smooth pressurizing surface having rigidity, therein, in the case where the material is a circuit substrate, in order to form the circuit pattern precisely at later processes ad to secure the insulation property of the resin layer, the convex hapes of the material are laminated in the resin layer whilie embedding them therein and the surface of the molded product is made smooth.

According to the fifth feature of the present invention, a lamination molding method is provided, in which, in either one of the first to fourth features, even in the case also where the surface of the resin layer of the material applied with the printing, by pressurizing the surface of the resin layer applied with the printing while being in contact with the smooth pressurizing surface, the printing applied in advance can be clearly indicated without being out of the place of the printing or any distortion, and in addition the number of process is simplified.

According to the sixth feature, a lamination molding apparatus is provided, which comprises the upper platen and the lower platen which are provided facing each other so as to come close to and separate from each other, melting means for melting the resin layer and the smooth pressurizing-surfaces at least one of which can be deformed resiliently, wherein the convex shapes of the material is embedded in the resin layer and the surface of the molded product is molded smooth.

According to the seventh feature, a lamination molding apparatus is provided, which, in the sixth feature, comprises the control means for changing the initial clamping process to pressure the material to a pair of smooth pressurizing surfaces under the pressure which can prevent the molten resin layer from being shrunk and the main clamping process to pressure the material under the pressure which can mold the surface of the molded product smooth, wherein, in the state where the pattern such as information and design are printed in advance, it is laminate-molded without being out of the place of the pattern and the number of the processes is simplified to obtain the molded product with clear printing. According to the eighth feature, a lamination molding apparatus is provided, which, in either one of the sixth or seventh feature, comprises the molding space sealed for accommodating the material and the depressurizing means to depressurize the molding space, wherein, at the time of laminate-molding the material while embedding the convex shapes of the material in the resin material any bubble and void can be prevented from generating.

According to the ninth feature, a lamination molding apparatus is provided, which comprises, in the eighth feature, the film body having flexibility provided on at least one of the opposing surfaces of the upper platen and the lower platen and the frame to form the molding space between the opposing surfaces of the upper platen and lower platen and the contact pressurizing means to contact the film body by making it to come close to either one of the upper platen and the lower platen and separating the film body from either one of the opposing surfaces on which the film body is provided and pressurize the material between the smooth surface provided on another opposing surface of the upper platen and the lower platen, wherein the material is pressurized even on allover the material, and it is possible to laminate-mold the molded product in a good precision preventing the resin of the molten resin layer from being leaked out from the edge of the molten resin layer.

According to the tenth feature, a lamination molding method is provided, wherein, in the ninth feature, by making the dimension approximately identical with the molded product, it can laminate-mold the molded product in more good precision.

According to the eleventh feature, a lamination molding apparatus is provided in which, in the features of sixth-tenth, the lamination member of the material has the anxiety of the brittle destruction, and even itself is of the convex shapes, these can be embedded in the material without generating of the brittle destruction to mold the surface of the molded product smooth.

According to the twelfth feature, a lamination apparatus is provided, in either one of the six to eleventh features, in which, even in the case where the resin layer of the material is printed on its surface, it is possible to laminate-mold without getting out of the place of printing and simplify the number of processes to obtain the molded product with clear printing.

According to the thirteenth feature, a lamination molding apparatus is provided, in either one of the sixth to tenth features, in Which, in the case where the lamination member of the material is the circuit substrate printed in the surface thereof with the circuit pattern as convex shapes and the resin layer is of insulation property, in order to form the circuit pattern precisely in the later process, the insulation layer formed in the surface with the circuit pattern can be molded smooth, the insulation property of the resin layer can be secured, so that while laminate-molding the convex shapes in the resin layer like being embedded, the surface of the molded product can be molded smooth.

What is claimed is:

1. A method of lamination molding, in which a material to be laminate-molded is made of a resin layer and a lamination member having convex shapes and the convex shapes of the material to be laminate-molded is embedded in the resin layer, the method comprises the steps of:
    disposing the material to be laminate-molded between smooth pressurizing surfaces, at least one of those surfaces comprising a pressurizing plate that is deformable resiliently,
    depressurizing between the resin layer and the material to be laminate-molded and thereabout without pressurizing the resin layer and the material to be laminate-molded, and
    melting the resin layer while keeping the depressurizing, wherein by pressurizing the material to be laminate-molded at a given pressure by there pair of smooth pressurizing surfaces initially comprises pressurizing the at least one of the pressurizing surfaces comprising the pressurizing plate so that it is deformed resiliently in accordance with the convex shapes of the material to be laminate-molded, and subsequently restoring of the pressurizing surface comprised of the pressurizing plate to the smooth state to mold the surface of the molded product smoothly on both sides as a result of a main clamping process.

2. The lamination molding method according to claim 1, wherein, by a film body having flexibility, through the pressurizing plate deformable resiliently constituting the at least one of the smooth pressurizing surfaces, the material to be laminate-molded is pushed and pressurized to another pressurizing surface having rigidity.

3. The lamination molding method according to claim 1, wherein, prior to the main clamping process, an initial clamping process to pressure the material to be laminated under an initial pressure to prevent the resin layer from being shrunk due to the melting is carried out.

4. A lamination molding method, wherein a material to be laminate-molded is made from a resin layer and a lamination member having convex shapes which are to be laminated while being embedded in the resin layer, the surface of a molded product is molded smooth, comprising the steps of:
    disposing the convex shapes to be laminate-molded between a smooth pressurizing surface having rigidity and a pressurizing plate having flexibility in response to an applied pressure,
    depressurizing a sealed area between the smooth pressurizing surface and the pressurizing plate and thereabout without pressurizing the resin layer and the lamination member,
    melting the resin layer while maintaining the depressurizing, and
    applying a pressure to the flexible pressurizing plate to push the material to be laminate-molded against the smooth pressurizing surface having rigidity.

5. The lamination method according to claim 3, wherein the resin layer of the material to be laminate-molded is applied with printing in the surface thereof, and the surface applied with the printing is pressurized to the smooth pressurizing surface in such a manner as the surface of the resin layer is in contact with the smooth pressurizing surface.

6. A lamination molding apparatus, wherein the material to be laminate-molded consists of a resin layer and a lamination member having convex shapes to be embedded in the resin and provide a smooth surface of the molded product, comprising:
    an upper platen and a lower platen which can relatively come close to and separate from one another, forming an air tight chamber when in closed opposition,
    a melting means to melt the resin layer, and
    a pair of smooth pressurizing surfaces, at least one pressurizing surface comprising a resiliently deformable pressurizing plate.

7. The lamination molding apparatus according to claim 6, further comprising:
    a control means for changing the molding apparatus between an initial clamping process to pressurize the material to be laminate-molded to the pair of smooth pressurizing surfaces at the pressure which can prevent the molten resin layer from being shrunk, and a main clamping process which laminates the convex shapes of the material to be laminate-molded while being embedded in the resin layer and pressurizes the material to be laminate-molded at a pressure under which the surface of the molded product can be molded smooth.

8. The lamination molding apparatus according to claim 6, further comprising a suction means for depressurizing the airtight chamber forming the molding space.

9. The lamination molding apparatus according to claim 8, further comprising:
- a film body having flexibility provided on at least one of opposing surfaces of the upper platen and the lower platen,
- a frame to form the molding space by being clamped between the opposing surfaces of the upper platen and the lower platen,
- a contact pressurizing means to make the film body either contact or separate from a surface of an associated one of at least one of the upper platen or the lower platen and pressurize the material to be laminate-molded between that surface and the smooth surface formed on the other of the upper platen or the lower platen.

10. The lamination molding apparatus according to claim 9, wherein the dimension of the pressurizing-plate is made approximately identical with the molded product.

11. A lamination molding apparatus according to claim 6, wherein the lamination member of the material to be laminate-molded has the possibility of brittle destruction and is itself of the convex shape.

12. A lamination molding apparatus of claim 11, wherein the resin layer of the material to be laminate-molded is applied with printing on its surface and the surface applied with such printing is pressurized to the smooth pressurizing surface in the state where the surface is in contact with a smooth pressurizing plate.

13. A lamination molding apparatus according to claim 6, where the lamination member of the material to be laminate-molded is a circuit substrate formed with a circuit pattern as a convex shape on the surface of an insulation layer and the resin layer has an insulation property.

* * * * *